US011938458B2

(12) United States Patent
Constantz et al.

(10) Patent No.: US 11,938,458 B2
(45) Date of Patent: *Mar. 26, 2024

(54) CONTINUOUS CARBON SEQUESTRATION MATERIAL PRODUCTION METHODS AND SYSTEMS FOR PRACTICING THE SAME

(71) Applicant: Blue Planet Systems Corporation, Los Gatos, CA (US)

(72) Inventors: Brent R. Constantz, Portola Valley, CA (US); Mark A. Bewernitz, Los Gatos, CA (US); Chris L. Camire, Morgan Hill, CA (US); Seung-Hee Kang, San Jose, CA (US); Jacob Schneider, San Jose, CA (US)

(73) Assignee: Blue Planet Systems Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,006

(22) Filed: Apr. 20, 2022

(65) Prior Publication Data

US 2022/0250028 A1    Aug. 11, 2022

Related U.S. Application Data

(63) Continuation of application No. 16/943,540, filed on Jul. 30, 2020, now Pat. No. 11,344,861, which is a (Continued)

(51) Int. Cl.
*B01J 20/04*   (2006.01)
*B01D 53/62*   (2006.01)
(Continued)

(52) U.S. Cl.
CPC ......... *B01J 20/043* (2013.01); *B01J 20/3204* (2013.01); *B01J 20/3236* (2013.01);
(Continued)

(58) Field of Classification Search
CPC ...... B01D 2259/4591; B01D 2257/504; B01D 2251/606; B01D 2251/404;
(Continued)

(56) References Cited

U.S. PATENT DOCUMENTS 2,698,251 A   12/1954  Shea, Jr. et al.
3,276,203 A   10/1966  Squires
(Continued)

FOREIGN PATENT DOCUMENTS

CA    2036597 C       11/1997
DE    102007035106 A1  2/2009
(Continued)

OTHER PUBLICATIONS

Kelemen et al., Engineered carbon mineralization in ultramafic rocks for CO2 removal from air: Review and new Insights, Chemical Geology, Sep. 2020, vol. 550, No. 119628, p. 1-22.
(Continued)

*Primary Examiner* — Joseph W Drodge
(74) *Attorney, Agent, or Firm* — Peter W. Schroen; Bret E. Field; Bozicevic, Field & Francis LLP

(57) ABSTRACT

Methods of producing solid $CO_2$ sequestering carbonate materials are provided. Aspects of the methods include introducing a divalent cation source into a flowing aqueous liquid (e.g., a bicarbonate rich product containing liquid) under conditions sufficient such that a non-slurry solid phase $CO_2$ sequestering carbonate material is produced. Also provided are systems configured for carrying out the methods.

16 Claims, 16 Drawing Sheets

Related U.S. Application Data continuation of application No. 15/963,708, filed on Apr. 26, 2018, now Pat. No. 10,766,015, which is a continuation of application No. 14/877,766, filed on Oct. 7, 2015, now Pat. No. 9,993,799.

(60) Provisional application No. 62/200,542, filed on Aug. 3, 2015, provisional application No. 62/163,107, filed on May 18, 2015, provisional application No. 62/163,118, filed on May 18, 2015, provisional application No. 62/062,084, filed on Oct. 9, 2014.

(51) Int. Cl.

| | | |
|---|---|---|
| *B01D 53/82* | (2006.01) | |
| *B01J 4/00* | (2006.01) | |
| *B01J 19/06* | (2006.01) | |
| *B01J 19/24* | (2006.01) | |
| *B01J 20/32* | (2006.01) | |
| *C01B 32/60* | (2017.01) | |
| *C01F 5/24* | (2006.01) | |
| *C01F 11/18* | (2006.01) | |
| *C04B 14/26* | (2006.01) | |
| *C04B 18/06* | (2006.01) | |

(52) U.S. Cl.
CPC ............... *C01B 32/60* (2017.08); *C01F 5/24* (2013.01); *C01F 11/182* (2013.01); *C04B 14/26* (2013.01); *C04B 18/06* (2013.01); *B01D 53/62* (2013.01); *B01D 53/82* (2013.01); *B01D 2251/304* (2013.01); *B01D 2251/306* (2013.01); *B01D 2251/402* (2013.01); *B01D 2251/404* (2013.01); *B01D 2251/606* (2013.01); *B01D 2257/504* (2013.01); *B01D 2259/4591* (2013.01); *B01J 4/00* (2013.01); *B01J 19/06* (2013.01); *B01J 19/24* (2013.01); *Y02C 20/40* (2020.08)

(58) Field of Classification Search
CPC ........ B01D 2251/402; B01D 2251/306; B01D 2251/304; B01D 53/62; B01D 53/72; B01D 53/81; B01D 53/82; B01D 53/83; B01J 19/06; B01J 19/24; B01J 19/2415; B01J 20/043; B01J 20/3236; B01J 20/3204; B01J 2219/24; B01J 2219/2418; B01J 2219/242; B01J 20/43; Y02C 10/08; C04B 14/26; C04B 18/02; C04B 18/021; C04B 18/028; C04B 18/06; C04B 18/062065; C04B 18/08; C04B 18/081; C04B 20/02; C04B 20/023; C04B 22/0086; C04B 14/28; C04B 18/062; C04B 18/065; C01F 5/24; C01F 11/18; C01F 11/181; C01F 11/182; C01F 11/185; C01B 32/50; C01B 32/55; C01B 32/60; C02F 1/20
See application file for complete search history.

(56) References Cited

U.S. PATENT DOCUMENTS

| | | |
|---|---|---|
| 3,628,919 A | 12/1971 | Beauchamp et al. |
| 3,785,802 A | 1/1974 | Roberti et al. |
| 4,328,086 A | 5/1982 | Takenaka et al. |
| 4,350,567 A | 9/1982 | Moorehead et al. |
| 5,164,187 A | 11/1992 | Constantz et al. |
| 5,188,670 A | 2/1993 | Constantz |
| 5,279,831 A | 1/1994 | Constantz et al. |
| 5,480,518 A | 1/1996 | Shane et al. |
| 5,484,533 A | 1/1996 | Crawford et al. |
| 5,584,905 A | 12/1996 | Wilson |
| 5,665,319 A | 9/1997 | Hirama et al. |
| 5,695,545 A | 12/1997 | Cho et al. |
| 6,872,240 B2 | 3/2005 | Pellegrin |
| 7,176,017 B2 | 2/2007 | Parent et al. |
| 7,264,725 B2 | 9/2007 | Vido et al. |
| 7,579,185 B2 | 8/2009 | Parent et al. |
| 7,727,374 B2 | 6/2010 | Jones |
| 7,735,274 B2 | 6/2010 | Constantz et al. |
| 7,749,476 B2 | 7/2010 | Constantz et al. |
| 7,820,432 B2 | 10/2010 | Parent et al. |
| 7,906,028 B2 | 3/2011 | Constantz et al. |
| 7,914,685 B2 | 3/2011 | Constantz et al. |
| 7,931,809 B2 | 4/2011 | Constantz et al. |
| 7,966,250 B2 | 6/2011 | Constantz et al. |
| 8,329,458 B2 | 12/2012 | Parent et al. |
| 8,329,459 B2 | 12/2012 | Parent et al. |
| 8,329,460 B2 | 12/2012 | Parent et al. |
| 8,333,944 B2 | 12/2012 | Constantz et al. |
| 8,741,244 B2 | 6/2014 | Jones |
| 8,795,508 B2 | 8/2014 | Jones |
| 8,857,118 B2 | 10/2014 | Constantz et al. |
| 9,359,221 B2 | 6/2016 | Jones et al. |
| 9,707,513 B2 | 7/2017 | Constantz et al. |
| 9,957,623 B2 | 5/2018 | Gilliam et al. |
| 9,993,799 B2 | 6/2018 | Constantz et al. |
| 10,668,443 B2 | 6/2020 | Kuppler et al. |
| 10,711,236 B2 | 7/2020 | Constantz et al. |
| 10,766,015 B2 | 9/2020 | Constantz et al. |
| 11,344,861 B2* | 5/2022 | Constantz ............... C04B 14/26 |
| 2003/0005860 A1 | 1/2003 | Goodson |
| 2004/0086632 A1 | 5/2004 | Vlajnic et al. |
| 2004/0131754 A1 | 7/2004 | Zitelli et al. |
| 2004/0200393 A1* | 10/2004 | Zauderer ................... C01B 3/02 |
| | | 110/345 |
| 2004/0234443 A1 | 11/2004 | Chen et al. |
| 2005/0180910 A1 | 8/2005 | Park et al. |
| 2007/0217981 A1 | 9/2007 | Van Essendelft |
| 2009/0169452 A1 | 7/2009 | Constantz et al. |
| 2009/0214408 A1 | 8/2009 | Blake et al. |
| 2009/0301352 A1 | 12/2009 | Constantz et al. |
| 2010/0024686 A1 | 2/2010 | Constantz et al. |
| 2010/0077691 A1 | 4/2010 | Constantz et al. |
| 2010/0086983 A1 | 4/2010 | Gellett et al. |
| 2010/0093049 A1* | 4/2010 | Datta ...................... B01D 53/84 |
| | | 435/167 |
| 2010/0116683 A1* | 5/2010 | Gilliam ..................... C25B 1/04 |
| | | 204/252 |
| 2010/0135891 A1 | 6/2010 | Hansen et al. |
| 2010/0150802 A1 | 6/2010 | Gilliam et al. |
| 2010/0219373 A1 | 9/2010 | Seeker et al. |
| 2010/0230830 A1 | 9/2010 | Farsad et al. |
| 2010/0247410 A1 | 9/2010 | Constantz et al. |
| 2010/0313794 A1 | 12/2010 | Constantz et al. |
| 2011/0052466 A1 | 3/2011 | Liu |
| 2011/0091366 A1 | 4/2011 | Kendall et al. |
| 2011/0132840 A1 | 6/2011 | Choi et al. |
| 2011/0220574 A1 | 9/2011 | Bakajin et al. |
| 2011/0253630 A1 | 10/2011 | Bakajin et al. |
| 2011/0256048 A1* | 10/2011 | Brent ...................... B01D 53/62 |
| | | 423/432 |
| 2011/0277474 A1 | 11/2011 | Constantz et al. |
| 2011/0297600 A1 | 12/2011 | Constantz et al. |
| 2011/0300043 A1 | 12/2011 | Sano et al. |
| 2012/0000175 A1 | 1/2012 | Wormser |
| 2012/0082839 A1 | 4/2012 | Ha et al. |
| 2012/0111236 A1 | 5/2012 | Constantz et al. |
| 2012/0134906 A1 | 5/2012 | Mastin et al. |
| 2012/0211421 A1 | 8/2012 | Self et al. |
| 2012/0220019 A1 | 8/2012 | Lackner |
| 2012/0244053 A1 | 9/2012 | Self et al. |
| 2012/0291675 A1 | 11/2012 | Camire et al. |
| 2013/0036945 A1 | 2/2013 | Constantz et al. |
| 2013/0195747 A1 | 8/2013 | Kendall et al. |
| 2013/0255542 A1 | 10/2013 | Clodic et al. |
| 2013/0256113 A1* | 10/2013 | Tumiatti ................... C10B 49/14 |
| | | 422/187 |
| 2013/0256989 A1 | 10/2013 | Baker et al. |
| 2013/0310575 A1 | 11/2013 | Hatton et al. |

(56) References Cited

U.S. PATENT DOCUMENTS

| | | |
|---|---|---|
| 2013/0323143 A1 | 12/2013 | Olfi et al. |
| 2014/0234946 A1 | 8/2014 | Constantz et al. |
| 2014/0271440 A1 | 9/2014 | Constantz et al. |
| 2014/0322803 A1 | 10/2014 | Constantz et al. |
| 2014/0370242 A1 | 12/2014 | Constantz et al. |
| 2015/0083607 A1 | 3/2015 | Gilliam et al. |
| 2015/0329369 A1 | 11/2015 | Heidel et al. |
| 2016/0177344 A1 | 6/2016 | Subhas et al. |
| 2017/0080386 A1 | 3/2017 | Fradette et al. |

FOREIGN PATENT DOCUMENTS

| | | |
|---|---|---|
| EP | 2169027 A1 | 3/2010 |
| WO | WO1992001629 A1 | 2/1992 |
| WO | WO2002060825 A2 | 8/2002 |
| WO | WO2007146094 A2 | 12/2007 |
| WO | WO2008060435 A2 | 5/2008 |
| WO | WO2008137082 A1 | 11/2008 |
| WO | WO2009151709 A2 | 12/2009 |
| WO | WO2009155596 A2 | 12/2009 |
| WO | WO2011069050 A1 | 6/2011 |
| WO | WO2012141977 A1 | 10/2012 |
| WO | WO2012166701 A2 | 12/2012 |
| WO | WO2013016708 A1 | 1/2013 |
| WO | WO2014039578 A1 | 3/2014 |
| WO | WO2014144848 A1 | 9/2014 |
| WO | WO2015134408 A1 | 9/2015 |
| WO | WO2021228979 A1 | 11/2021 |

OTHER PUBLICATIONS

Maruyama et al., A New Concept of Calcium Carbonate Concrete using Demolished Concrete and CO2, Journal of Advanced Concrete Technology, Oct. 2021, vol. 19, No. 10, p. 1052-1060, abstract only.

The University of Tokyo, A concrete solution: Recycled concrete and CO2 from the air are made into a new building material, Oct. 8, 2021, Retrieved from: https://www.u-tokyo.ac.jp/focus/en/press/z0508_00190.html.

Blok et al. "Gas-Liquid Mass Transfer in Fixed-Bed Reactors with Cocurrent Downflow Operating in the Pulsing Flow Regime," AIChE Journal, May 1984, vol. 30, No. 3, pp. 393-401.

Boelhouwer. "Nonsteady operation of trickle-bed reactors: hydrodynamics, mass and heat transfer," Technische Universiteit Eindhoven, 2001, 213 pages.

Gu et al. "PVA-based hybrid membranes from cation exchange multisilicon copolymer for alkali recovery," Desalination, vol. 304, pp. 25-32 (2012).

Hao et al. "Alkali recovery using PVA/SiO2 cation exchange membranes with different -COOH contents," Journal of Hazardous Materials, vol. 244-245, pp. 348-356 (2013).

Hao et al. "Cation exchange hybrid membranes prepared from PVA and multisilicon copolymer for application in alkali recovery," Journal of Membrane Science, vol. 425-426, pp. 156-162 (2013).

Janecki et al. "Parameters characterising the pulsing flow for cocurrent flow of gas and foaming liquid in a pressurised trickle-bed reactor," Proceedings of European Congress of Chemical Engineering (ECCE-6), Copenhagen Sep. 16-20, 2007, pp. 1-11.

Liu et al. "Diffusion dialysis membranes with semi-interpenetrating network for alkali recovery," Journal of Membrane Science, vol. 451, pp. 18-23 (2014).

Mackey et al. "CO2 Injection Using Membrane Technology," Bev-Piants '95, Mar. 21-Mar. 23, 1995, 22 pages.

MEMBRANA. "Liqui-Cel Membrane Contactors: Liquid Degassing & Gasification Solutions," Product Brochure, 2012, 5 pages.

Molenaar et al. "Calcium carbonate cementation of sand: A method for producing artificially cemented samples for geotechnical testing and a comparison with natural cementation processes," Engineering Geology, 35 (1993) 103-122.

Statkraft. "Statkraft to build world's first osmotic power plant," Mar. 10, 2007, 2 pages, Retrieved online: http://www.statkraft.com/pro/press/Press_releases/2007.Statkraft_to_build_world_s_first_osmotic_power_plantasp.

Tanaka et al. "ion-Exchange Membranes," International Journal of Chemical Engineering, 2012, 3 pages.

Versteeg et al. "Absorption of CO2 and H2S in Aqueous Alkanolamine Solutions using a Fixed-Bed Reactor with Cocurrent Downflow Operation in the Pulsing Flow Regime," Chem. Eng. Process., 24 (1988) pp. 163-176.

Weekman, Jr. et al. "Fluid-Flow Characteristics of Concurrent Gas-Liquid Flow in Packed Beds," AIChE Journal, Nov. 1964, vol. 10, No. 6, pp. 951-957.

Wiesler. "Membrane Contactors: An Introduction to the Technology," Ultrapure Water, May/Jun. 1996, pp. 27-31.

Zeinalipour-Yazdi et al. "Kinetic Rates and Linear Free Energy Relationships for Water Dissociation on Transition hd Noble Metal Dimers," The Journal of Physical Chemistry A 113, 2009, pp. 6971-6978.

* cited by examiner

Ottowa Silica Sand Uncoated:

Ottowa Silica Sand Coated:

Natural Limestone Crushed Sand Uncoated:

Natural Limestone Crushed Sand Coated:

Total reflectance over the solar spectrum: (Red) 69%, (Blue) 38%, (Brown) 40%, (Green) 40%

| Mix # | Mix Sand |
|---|---|
| 163 | Silica Sand Control |
| 173 | Coated Silica Sand |
| 168 | Limestone Glass Sand |
| 172 | Coated Limestone Glass Sand |

US 11,938,458 B2

CONTINUOUS CARBON SEQUESTRATION MATERIAL PRODUCTION METHODS AND SYSTEMS FOR PRACTICING THE SAME

CROSS-REFERENCE TO RELATED APPLICATIONS

This application is a continuation of U.S. patent application Ser. No. 16/943,540 filed on Jul. 30, 2020; which application is a continuation of U.S. patent application Ser. No. 15/963,708 filed on Apr. 26, 2018; which application is a continuation of U.S. patent application Ser. No. 14/877,766 filed on Oct. 7, 2015; which application, pursuant to 35 U.S.C. § 119(e), this application claims priority to the filing dates of U.S. Provisional Application Ser. No. 62/062,084 filed on Oct. 9, 2014; U.S. Provisional Application Ser. No. 62/163,107 filed on May 18, 2015; U.S. Provisional Application Ser. No. 62/163,118 filed on May 18, 2015; and U.S. Provisional Application Ser. No. 62/200,542 filed on Aug. 3, 2015; the disclosures of which applications are herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. Because human activities since the industrial revolution have rapidly increased concentrations of atmospheric $CO_2$, anthropogenic $CO_2$ has been implicated in global warming and climate change, as well as increasing oceanic bicarbonate concentration. Ocean uptake of fossil fuel $CO_2$ is now proceeding at about 1 million metric tons of $CO_2$ per hour.

Concerns over anthropogenic climate change and ocean acidification, compounded with recent changes in U.S. Federal policy to include carbon dioxide ($CO_2$) as a regulated air pollutant, have fueled an urgency to discover scalable and cost effective methods of carbon capture and sequestration (CCS).

SUMMARY

Methods of producing solid $CO_2$ sequestering carbonate materials are provided.

Aspects of the methods include introducing a divalent cation source into a flowing aqueous liquid (e.g., a bicarbonate rich product containing liquid) under conditions sufficient such that a non-slurry solid phase $CO_2$ sequestering carbonate material is produced. Also provided are systems configured for carrying out the methods.

DETAILED DESCRIPTION

Figure 1:
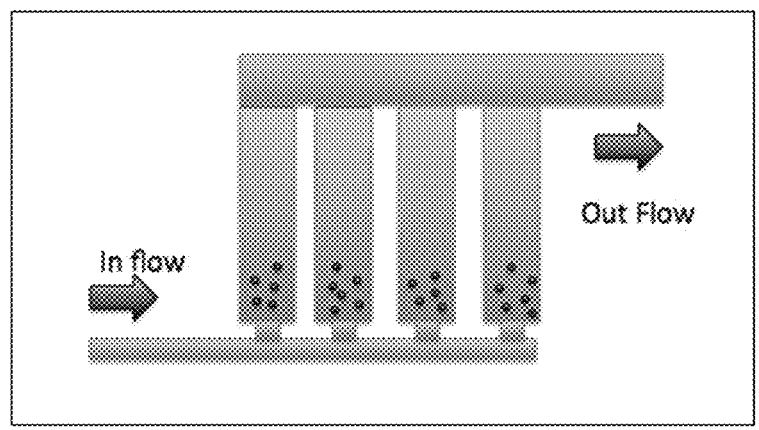
FIG. 1 provides a depiction of a fluidized bed reactor in accordance with an embodiment of the invention.

Methods of producing solid $CO_2$ sequestering carbonate materials are provided. Aspects of the methods include introducing a divalent cation source into a flowing liquid (e.g., a bicarbonate rich product containing liquid) under conditions sufficient such that a non-slurry solid phase $CO_2$ sequestering carbonate material is produced. Also provided are systems configured for carrying out the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, aspects of the invention include methods of producing a $CO_2$ sequestering carbonate material. By $CO_2$ sequestering carbonate material is meant a material that stores a significant amount of $CO_2$ in a storage-stable format, such that $CO_2$ gas is not readily produced from the material and released into the atmosphere. In certain embodiments, the $CO_2$-sequestering material includes 5% or more, such as 10% or more, including 25% or more, for instance 50% or more, such as 75% or more, including 90% or more of $CO_2$, e.g., present as one or more carbonate compounds. The $CO_2$-sequestering materials produced in accordance with methods of the invention may include one or more carbonate compounds, e.g., as described in greater detail below. The amount of carbonate in the $CO_2$-sequestering material, e.g., as determined by coulometry, may be 40% or higher, such as 70% or higher, including 80% or higher.

$CO_2$ sequestering materials, e.g., as described herein, provide for long-term storage of $CO_2$ in a manner such that $CO_2$ is sequestered (i.e., fixed) in the material, where the sequestered $CO_2$ does not become part of the atmosphere. When the material is maintained under conditions conventional for its intended use, the material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the material. With respect to the $CO_2$-sequestering materials, when they are employed in a manner consistent with their intended use and over their lifetime, the amount of degradation, if any, as measured in terms of $CO_2$ gas release from the product will not exceed 10% per year, such as 5% per year, and in certain embodiments, 1% per year. In some instances, $CO_2$-sequestering materials provided by the invention do not release more than 1%, 5%, or 10% of their total $CO_2$ when exposed to normal conditions of temperature and moisture, including rainfall of normal pH, for there intended use, for at least 1, 2, 5, 10, or 20 years, or for more than 20 years, for example, for more than 100 years. Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, or more than 1000 years).

Aspects of the invention include continuous processes to produce solid $CO_2$ sequestering carbonate materials. As the processes are continuous, they are not batch processes. In practicing continuous processes of the invention, a divalent cation source is introduced into a flowing aqueous liquid (e.g., a bicarbonate rich product containing liquid) under conditions sufficient such that a non-slurry solid phase $CO_2$ sequestering carbonate material is produced in the flowing aqueous bicarbonate rich product.

Divalent Cation Source

In practicing methods of the invention, any convenient divalent cation source may be employed. Divalent cations, such as alkaline earth metal cations, e.g., calcium and magnesium cations, are of interest. Cation sources of interest include, but are not limited to, the brine from water processing facilities, such as sea water desalination plants, brackish water desalination plants, groundwater recovery facilities, wastewater facilities, and the like, which produce a concentrated stream of solution high in cation contents. Also of interest as cation sources are naturally occurring sources, such as, but not limited to, native seawater and geological brines, which may have varying cation concentrations and may also provide a ready source of cations to trigger the production of carbonate solids from a bicarbonate rich product or component thereof (e.g., LCP), such as described in greater detail below. The cation source employed in such solid carbonate production steps may be the same as or different from the aqueous media employed in the bicarbonate rich product production step, e.g., as described below. In some instances, the cation source may be one that has been produced using a membrane mediated protocol, e.g., as described in PCT Application Serial No. US2015/018361 now published as WO 2015/134408; the disclosure of which is herein incorporated by reference.

A given divalent cation source may be a solid or liquid, as desired. For example, a liquid divalent cation source may be employed. Alternatively, a solid divalent cation source, such as a particulate source (e.g., a powder) may be employed.

Aqueous Flowing Liquid

As summarized above, in practicing methods of the invention the divalent cation source is introduced into an aqueous flowing liquid. Aqueous flowing liquids in which a divalent cation source may be introduced include bicarbonate and/or carbonate containing liquids. Where the liquid is a bicarbonate and/or carbonate containing liquid, it is liquid that includes bicarbonate ions and/or carbonate ions. The pH of the liquid may vary, ranging in some instances from 7 to 14, such as 7 to 12.

In some instances, the liquid is a bicarbonate rich product containing liquid. Bicarbonate rich product containing liquids that find use methods of the invention include, but are not limited to, two-phase liquids that include droplets of a liquid condensed phase (LCP) in a bulk liquid, e.g., bulk solution. By "liquid condensed phase" or "LCP" is meant a phase of a liquid solution which includes bicarbonate ions, wherein the concentration of bicarbonate ions is higher in the LCP phase than in the surrounding, bulk liquid.

LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution.

The bulk phase and LCP are characterized by having different $K_{eq}$, different viscosities, and different solubilities between phases. Bicarbonate, carbonate, and divalent ion constituents of the LCP droplets are those that, under appropriate conditions, may aggregate into a post-critical nucleus, leading to nucleation of a solid phase and continued growth. While the association of bicarbonate ions with divalent cations, e.g., $Ca^{2+}$, in the LCP droplets may vary, in some instances bidentate bicarbonate ion/divalent cation species may be present. For example, in LCPs of interest, $Ca^{2+}$/bicarbonate ion bidentate species may be present. While the diameter of the LCP droplets in the bulk phase of the LCP may vary, in some instances the droplets have a diameter ranging from 1 to 500 nm, such as 10 to 100 nm. In the LCP, the bicarbonate to carbonate ion ratio, (i.e., the $HCO_3^-$/$CO_3^{2-}$ ratio) may vary, and in some instances is 10 or greater to 1, such as 20 or greater to 1, including 25 or greater to 1, e.g., 50 or greater to 1. Additional aspects of LCPs of interest are found in Bewernitz et al., "A metastable liquid precursor phase of calcium carbonate and its interactions with polyaspartate," Faraday Discussions. 7 Jun. 2012. DOI: 10.1039/c2fd20080e (2012) 159: 291-312. The presence of LCPs may be determined using any convenient protocol, e.g., the protocols described in Faatz et al., Advanced Materials, 2004, 16, 996-1000: Wolf et al., Nanoscale, 2011, 3, 1158-1165; Rieger et al., Faraday Discussions, 2007, 136, 265-277; and Bewernitz et al., Faraday Discussions, 2012, 159, 291-312.

Where the bicarbonate rich product liquid has two phases, e.g., as described above, the first phase may have a higher concentration of bicarbonate ion than a second phase, where the magnitude of the difference in bicarbonate ion concentration may vary, ranging in some instances from 0.1 to 4, such as 1 to 2. For example, in some embodiments, a bicarbonate rich product liquid may include a first phase in which the bicarbonate ion concentration ranges from 1000 ppm to 5000 ppm, and a second phase where the bicarbonate ion concentration is higher, e.g., where the concentration ranges from 5000 ppm to 6000 ppm or greater, e.g., 7000 ppm or greater, 8000 ppm or greater, 9000 ppm or greater, 10,000 ppm or greater, 25,000 ppm or greater, 50,000 ppm or greater, 75,000 ppm or greater, 100,000 ppm, 500,000 or greater.

In addition to the above characteristics, a given bicarbonate rich product liquid may include a number of additional markers which serve to identify the source of $CO_2$ from it has been produced. For example, a given bicarbonate component may include markers which identify the water from which it has been produced. Waters of interest include naturally occurring waters, e.g., waters obtained from seas, oceans, lakes, swamps, estuaries, lagoons, brines, alkaline lakes, inland seas, as well as man-made waters, e.g., brines produced by water desalination plants, and the like. In such instances, markers that may be present include amounts of one or more of the following elements: Ca, Mg, Be, Ba, Sr, Pb, Fe, Hg, Na, K, Li, Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Alternatively or in addition to the above markers, a given bicarbonate component may include markers which identify the particular $CO_2$-containing gas used to produce the bicarbonate component. Such markers may include, but are not limited to, one or more of: nitrogen, mononitrogen oxides, e.g., NO, $NO_2$ and $NO_3$, oxygen, sulfur, monosulfur oxides, e.g., SO, $SO_2$ and $SO_3$), volatile organic compounds, e.g., benzo(a)pyrene $C_2OH_{12}$, benzo(g,h,l)perylene $C_{22}H_{12}$, dibenzo(a,h)anthracene $C_{22}H_{14}$, etc. Particulate components that may be present in the $CO_2$ containing gas from which the bicarbonate component is produced and therefore which may be present in the bicarbonate component include, but are not limited to particles of solids or liquids suspended in the gas, e.g., heavy metals such as strontium, barium, mercury, thallium, etc. When present, such markers may vary in their amounts, ranging in some instances from 0.1 to 10,000, such as 1 to 5,000 ppm.

Of interest in certain embodiments are agents (referred to herein as "bicarbonate promoters" or "BLCP promoters") that promote the production of high-bicarbonate-content bicarbonate additive (which may also be referred to herein as a bicarbonate admixture), e.g., by promoting the production and/or stabilization of BLCPs, e.g., facilitating the formation of a BLCP in a bicarbonate-containing solution while preventing precipitation of the solution's components to form solid carbonate-containing materials. A high-bicarbonate-content bicarbonate component is one that has a bicarbonate content of 0.1 wt % or greater, such as 4 wt % or greater, including 10 wt. % or greater, such as a bicarbonate component having a bicarbonate content ranging from 5 to 40 wt. %, such as 10 to 20 wt. %. The amount of bicarbonate promoter present in a given bicarbonate component may vary, where in some instances the amount ranges from 0.000001 wt. % to 40 wt. %, such as 0.0001 to 20 wt. % and including 0.001 to 10 wt. %. Such promoters are further described in U.S. patent application Ser. No. 14/112,495; the disclosure of which is herein incorporated by reference.

In some instances, the liquid is a carbonate ion containing liquid. Carbonate ion containing liquids include aqueous media having a pH of 10 or more, such as 11 or more, including 12 or more. Examples of such liquid include, but are not limited to, those described in U.S. Pat. Nos. 8,333,944; 8,177,909; 8,137,455; 8,114,214; 8,062,418; 8,006,446; 7,939,336; 7,931,809; 7,922.809; 7,914,685; 7,906,028; 7,887,694; 7,829,053; 7,815,880; 7,771,684; 7,753,618; 7,749,476; 7,744,761; and 7,735,274; the disclosures of which are herein incorporated by reference.

Introduction of Divalent Cations into a Flowing Aqueous Liquid

In practicing embodiments of the methods, divalent cations, e.g., as described above, are introduced into a flowing liquid (such as a bicarbonate rich product containing liquid, e.g., as described above), under conditions sufficient such that a non-slurry solid phase $CO_2$ sequestering carbonate material is produced in the flowing aqueous liquid. By "flowing" aqueous liquid is meant a liquid (such as described above) that is moving, e.g., as a stream, such that it is not stationary. The flow rate of the liquid, e.g., as determined relative to the site or location at which the divalent cations are introduced into the liquid, may vary. In some instances, the flow rate of the liquid ranges from 0.1 to 10 m/second, such as 0.2 to 2.0 m/s. In some instances, the flow rate of the liquid ranges from 10 LPD to 40B LPD (liters per day), such as 400,000 LPD to 12M LPD.

In some instances, the liquid is flowing through a housing or containment structure, where the length of the flow path of the liquid may vary. In some instances, the flow path ranges in length from 0.10 m to 100 m, such as 1 m to 10 m and including 1 m to 5.0 m. Along a given flow path, the flow rate of the liquid may be constant or varied, as desired. For example, the flow rate may be faster at the site of divalent cation introduction relative to the site of $CO_2$ sequestering carbonate material production. The magnitude of any change in flow rate may vary, where the magnitude of such change, if present, ranges in some instances from 2 to 100 times, such as 5 to 20 times. The flow rate may be varied using any convenient protocol, e.g., by placing barriers in the flow path, adjusting the elevation of the flow path, etc.

The amount of divalent cation source that is introduced into the liquid is sufficient to provide for the desired solid phase $CO_2$ sequestering carbonate material. While the amount may vary, in some instances the amount that is introduced into the liquid is sufficient to provide a concentration of divalent cation in the liquid at a location in the flow path just before material production that ranges from 10 ppm to 10,000 ppm, such as 200 ppm to 2,000 ppm. Where the divalent cation source is a liquid source having a divalent cation concentration ranging from 500 ppm to 20,000 ppm, such as 1000 ppm to 5000 ppm, the liquid divalent cation source may be introduced into the flowing liquid at a rate ranging from 0.1 m/s to 10 m/s, such as 0.2 m/s to 4 m/s. Alternatively, where the divalent cation source is a dry powder having a divalent cation concentration of 10 to 80% wt/wt., the power divalent cation source may be introduced into the flowing liquid at a rate ranging from 0.2 m/s to 10 m/s, such as 0.2 m/s to 4 m/s.

As the process is a continuous process, upon initiation of the process no solid carbonate material product, apart from any seed structure (e.g., as described below), will be present in the production zone of the flow path before introduction of the divalent cations into the flowing liquid. In some embodiments, at a time following the initial introduction of the divalent cations, a precursor composition forms at location downstream from the divalent cation introduction site. While the time between initial introduction and the formation of the non-solid precursor structure may vary, in some instances the time ranges from 0.001 sec to 10 min, such as 0.1 sec to 1 min. In these embodiments, the precursor composition forms at a distance from the divalent cation introduction site, where the location may be downstream from the divalent cation introduction site by a varying distance, where this distance may range in some instances from 1 cm to 10 m, such as 2 cm to 2 m. The precursor composition may be characterized as a transient zone where the initial clusters of carbonate mineral have not yet formed a polytype of the carbonate mineral and are highly unstable, making them more likely to accrete on to a solid surface than to homogeneously crystallize in solution to become part of a slurry.

The zone of accretion (carbonate growth) is defined by saturation index where:

$$SI=\log(IAP/Ksp)$$

(IAP is the ion activity product over Ksp solubility product) in relation to the activation energy (Stumm & Morgan 1981) where:

$$\Delta G=16\pi\sigma^{\hat{}}v^{\hat{}}2/[3(kT\ Ln\ S)^{\hat{}}2$$

where σ is the interfacial energy, v is the molecular volume, k is Boltzmann's constant, T is the absolute temperature, Ln is the natural logarithm operator, S is the relative supersatruation.

The zone of accretion can furthermore be modified by pressure, temperature and flow rate. Supersaturated solutions between 1× and 1000× supersaturation are of interest, such as 10× and 500× super saturation and including 11× and 300× supersaturation. The zone of accretion may be of a transient nature such that periodic dosing of various divalent cations results in periodicity of saturation index flows through the system. Also periodic alkaline component solutions can be introduced to brine solutions or solutions containing divalent cations creating similar response. Periodicity similar to diurnal cyclic variance seen in geologic settings where beach rock forms (Ref. Sedimentary Geology, 33 (1982) 157-172.

The system may be catalyzed by pH modification in the acidic or basic direction or using any convenient protocol. Introduction of $CO_2$ or carbonic acid into the reactor vessel is one modality of acidifying the system and modifying the zone of accretion. Another modality is the introduction of acid, e.g., hydrochloric acid (HCl). In such instances, HCl concentrations between 0.01 and 20%, such as between 0.5 and 10%, including between 1 and 3% may be employed. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity modulation, e.g., increase or decrease, of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Various condition parameters may be modulated during a given method to achieve a desired production of $CO_2$ sequestering carbonate material. For example, pressure may be maintained at a constant level along the flow path, or pressure may be modulated (i.e., varied) along the flow path, as desired. While the pressure may vary in a given method, in some instances the pressure ranges from 0.1 atm to 100 atm, such as 1 atm to 10 atm. In some embodiments, the pressure is varied, e.g., decreased, along the flow path. The magnitude of any change in pressure may vary, where the magnitude of such change, if present, ranges in some instances from 2 to 100 times, such as 5 to 10 times. The pressure may be varied using any convenient protocol, e.g., by reducing or increasing the volume of the flow path at a given location, fluid regime, etc. In some instances, the pressure is reduced at the location of $CO_2$ sequestering carbonate material relative to the divalent cation introduction site, e.g., where the magnitude of reduction may range from 0% to 100 or more %, such as 10% to 100%.

Alternatively or in addition, the temperature may be maintained at a constant level along the flow path, or modulated (i.e., varied) along the flow path, as desired. While the temperature may vary in a given method, in some instances the temperature ranges from −4° C. to +99° C., such as 0° C. to 80° C. In some embodiments, the temperature is varied, e.g., decreased or increased, along the flow path. The magnitude of any change in temperature may vary, where the magnitude of such change, if present, ranges in some instances from 1 to 50° C., such as 2 to 25° C. The temperature may be varied using any convenient protocol, e.g., by heating or cooling the liquid at various location(s) of the flow path.

In some instances, the solid phase $CO_2$ sequestering carbonate material is produced at a location that is downstream from the divalent cation source introduction site. By downstream is meant a location along the flow path in the direction of fluid flow that is separated from the divalent cation introduction site. The distance between the divalent cation introduction site and the material production site may vary, ranging in some instances from 1 cm to 2.5 km, such as 5 cm to 100 m.

Introduction of the divalent cation source into the flowing liquid, e.g., as described above, results in the production of a non-slurry solid phase $CO_2$ sequestering carbonate material. By non-slurry solid phase is meant a solid phase that is not a slurry, i.e., if maintained under static conditions it would not be a suspension of small particles in a liquid. As such, upon cessation of flowing liquid through the material production zone, the solid phase material produced according to embodiments of the methods settles (i.e., falls) out of suspension in 10 min or less, such as 5 min or less, and in some instances 1 min or less. As the material is a non-slurry solid phase, in some instances the longest dimension of a given amount of the produced material is 30 μm or greater, such as 100 μm or greater, including 1000 μm or greater. In some instances the product material is a particulate composition that is made up of a plurality of distinct particles. In such instances, the plurality of distinct particles may vary in size, ranging in some instances from 10 to 1,000,000 μm, such as 1,000 to 100,000 μm and including 5,000 to 50,000 μm. In such compositions, the mean diameter of the particles may vary, and in some instances ranges from 20 to 20,000 μm, such as 200 to 8,000 μm. The particles of such compositions may be regular or irregular, where in some instances the particles are ooids. In these embodiments, the carbonate material may be produced by successive coating of carbonate compounds onto growing particles, resulting in production of particulates as described above. In some instances, the non-slurry solid phase $CO_2$ sequestering carbonate material is a lithified unitary object. While the dimensions of such an object may vary, in some instances the object has a longest dimension ranging from 1,000 to 100,000, such as 5,000 to 50,000 μm. In these instances, the lithified object(s) produced in the production zone may be produced by carbonate materials forming in pores or interstices of pre-existing structures, uniting and agglomerating such structures into lithified masses.

The product carbonate materials may vary greatly. The product may include one or more different carbonate compounds, such as two or more different carbonate compounds, e.g., three or more different carbonate compounds, five or more different carbonate compounds, etc., including non-distinct, amorphous carbonate compounds. Carbonate compounds of products of the invention may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration, may be 40% or higher, such as 70% or higher, including 80% or higher.

In some instances solid solutions of phosphate, sulfate, borate, and silicate minerals and the like may develop with the carbonate, wherein the carbonate is still the dominant anionic complex. These other anions, when present, may substitute into the crystal lattice for the carbonate ion and occur, in some instances, below 50%, such as below 20%, and in some instances below 10%, to even just a few to less than 1%.

The carbonate compounds of the products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCO_3$). Calcium magnesium carbonate minerals of interest include, but are not limited to dolomite ($(CaMg)(CO_3)_2$), huntite ($Mg_3Ca(CO_3)_4$) and sergeevite ($Ca_2Mg_{11}(CO_3)_{13} \cdot H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1. In some instances, the product may include hydroxides, such as divalent metal ion hydroxides, e.g., calcium and/or magnesium hydroxides.

In some instances, the product that is produced is a white, highly reflective carbonate material, i.e., the material appears white in color to the human eye. As the material appears white to the human eye, it may be true white or light gray in actual color or hue. In some instances, the white material reflects 60% or more of incident light, such as 70% or more of incident, e.g., 80% or more, 90% or more, 95% or more, 99% or more, including, in some instances, 100% of incident light e.g., as measured by ASTM C1549. The product material may, in some instances, be a white pigment composition, e.g., as described in PCT Patent Application Serial No. US2015/047408 filed on Aug. 29, 2014; the disclosure of which is herein incorporated by reference.

In yet other embodiments, the product materials are carbonate cool pigment compositions. As the materials of these embodiments are cool pigment compositions, they have a low infrared absorption characteristic, i.e., they are highly reflective of infrared light, e.g., as compared to non-carbonate materials having the substantially the same, if not the same, color. For example, the NIR reflectance value of a brown cool pigment of the present invention is, in some instances, 10% or greater, such as 25% greater, including 50% or greater, as compared to the NIR reflectance value of a reference or control brown pigment of the same hue which is does not include a transition metal carbonate, e.g., as described herein. The cool pigment materials described herein are reflective of near infra-red (NIR) light. By NIR light is meant light having a wavelength ranging from 700 nanometers (nm) to 2.5 mm. The carbonate cool pigment materials described herein are colored. By "colored" is meant that they are non-white. As such, they do not appear white in color to the human eye. The color of a given carbonate cool pigment composition as described herein may be characterized by the CIELAB color system. As used in the present specification and claims, $L^*$, $a^*$ and $b^*$ refer to the parameters of the CIELAB color system. As used in the present specification and claims, "colored" means having an $L^*$ value of 95 or less, such as 90 or less, including 85 or less. In some instances, the pigments have an $L^*$ value ranging from 10 to 95, such as 20 to 95 and including 30 to 90. In some instances, the pigments have an $a^*$ value ranging from −30 to 30, such as −25 to 25. In some instances, the pigments have a $b^*$ value ranging from −20 to 50, such as −15 to 45. The cool pigments may appear to have a variety of different colors, where the colors include, but are not limited to: blacks, grays, browns, violets, purples, blues, teals, greens, yellows, oranges, pinks, reds, etc. The product material may, in some instances, be a cool pigment composition, e.g., as described in PCT Patent Application Serial No. US2015/047408 filed on Aug. 29, 2014; the disclosure of which is herein incorporated by reference. In these instances, various color imparting additives may be introduced into the flowing liquid, where such additives may result in the production of one or more transition metal carbonate materials. By transition metal carbonate material is meant a composition made up of one or more transition metal carbonate compounds, e.g., a composition that includes transition metal carbonate molecules, where the composition may include a single type of transition metal carbonate or two or more different types of transition metal carbonates, e.g., that differ from each other in terms of the transition metal ion component of the molecule. The transition metal carbonates may vary, and in some instances are period 4 transition metal carbonates, by which is meant that they are carbonates of period 4 transition metals, where period 4 transition metals of interest include, but are not limited to: Mn, Fe, Ni, Cu, Co, Zn. Specific period 4 transition metal carbonates that may be present in the transitional metal carbonate materials include, but are not limited to: $MnCO_3$, $FeCO_3$, $NiCO_3$, $CuCO_3$, $CoCO_3$, $ZnCO_3$, etc., as well as combinations thereof, e.g., $(TM)_m(CO_3)_n$), wherein TM is a transition metal (e.g., Mn,Fe,Co,Zn,Cu,Ni), and m and n are stoichiometric positive integers. Such color imparting additives include, but are not limited to, those described in PCT Patent Application Serial No. US20151047408 filed on Aug. 29, 2014; the disclosure of which is herein incorporated by reference.

In some instances, the method includes producing the solid phase $CO_2$ sequestering carbonate material in association with a seed structure. By seed structure is meant a solid structure or material that is present in the flowing liquid, e.g., in the material production zone, prior to divalent cation introduction into the liquid. By "in association with" is meant that the material is produced on at least one of a surface of or in a depression, e.g., a pore, crevice, etc., of the seed structure. In such instances, a composite structure of the carbonate material and the seed structure is produced. In some instances, the product carbonate material coats a portion, if not all of, the surface of a seed structure. In some instances, the product carbonate materials fills in a depression of the seed structure, e.g., a pore, crevice, fissure, etc.

Seed structures may vary widely as desired. The term "seed structure" is used to describe any object upon and/or in which the product carbonate material forms. Seed structures may range from singular objects or particulate compositions, as desired. Where the seed structure is a singular object, it may have a variety of different shapes, which may be regular or irregular, and a variety of different dimensions. Shapes of interest include, but are not limited to, rods, meshes, blocks, etc.

In some instances, the seed structure is a particulate composition, e.g., granular composition, made up of a plurality of particles. Where the seed structure is a particulate composition, the dimensions of particles making up the seed structure may vary, ranging in some instances from 0.01 to 1,000,000 μm, such as 0.1 to 100,000 μm. The number of particles in the seed structure may also vary, ranging in some instances from 5 to 5 trillion, such as 50 to 1 trillion, e.g., 100 to 100 billion, etc., where in some instances the number of particles making up the seed structure is 1,000 or more, such as 10,000 or more, including 100,000 or more, e.g., 1,000,000 or more.

The seed structure may be made up of any convenient material or materials. Materials of interest include both carbonate materials, such as described above, as well as non-carbonate materials. The seed structures may be naturally occurring, e.g., naturally occurring sands, shell fragments from oyster shells or other carbonate skeletal allochems, gravels, etc., or man-made, such as pulverized rocks, ground blast furnace slag, fly ash, cement kiln dust, red mud, and the like. For example, the seed structure may be a granular composition, such as sand, which is coated with the carbonate material during the process, e.g., a white carbonate material or colored carbonate material, e.g., as described above.

In some instances, seed structure may be coarse aggregates, such as friable Pleistocene coral rock, e.g., as may be obtained from tropical areas (e.g., Florida) that are too weak to serve as aggregate for concrete. In this case the friable coral rock can be used as a seed, and the solid $CO_2$ sequestering carbonate mineral may be deposited in the internal pores, making the coarse aggregate suitable for use in concrete, allowing it to pass the LA Rattler abrasion test. In some instances, where a light weight aggregate is desired, the outer surface will only be oenetrated by the solution of deposition, leaving the inner core relatively 'hollow' making a light weight aggregate for use in light weight concrete.

In methods where seed structures are employed, the flowing liquid with added divalent cation source may be contacted with the seed structures using a variety of different protocols. In some protocols, the seed structures are completely submerged in the flowing liquid, e.g., where the seed structures are submerged in a stream of the flowing liquid, etc. In some protocols, the seed structures are not submerged in the flowing liquid, e.g., where the flowing liquid may be flowed over a surface of the seed structures. For example, the flowing liquid may be contacted with the seed structures in a manner that results in the production of a thin layer of the flowing liquid on one or more surfaces of the seed structures. Such non-submerged approaches result, in some instances, in one or more of: increased rate of reaction as compared to submerged protocols (e.g., by ensuring non-dilutive chemistry); increased reaction as compared to submerged protocols, e.g., by way of higher gas liquid interface and $CO_2$ off-gassing; enhanced energy efficiency as compared to submerged protocols, e.g., since such protocols may avoid having to use agitation mechanisms (such as trommel, etc.). In some non-submerged embodiments, low mM carbon bearing solutions may be employed and efficient carbon capture on reasonable amounts of aggregate may be obtained. For example, non-submerged protocols may be employed in large scale light weight aggregate production, where the calcium bearing and carbon bearing solutions could be distributed (drip irrigated/distributed) over a field or large lyfted pile of rock, and the carbonate coating formed as the liquids percolate down into and throughout the bed of aggregate.

Methods as described herein may be carried out in a variety of different continuous reactors. Examples of continuous reactors of interest are further described below and in the Experimental section. Where a continuous reactor is employed, the location at which the $CO_2$ sequestering material is produced may be a fluidized bed subunit of the continuous reactor. Fluidized bed reactors of interest are configured to maintain a region of fluidized solids in a continuously flowing medium, and may have a fluid inlet, a fluid outlet, and a region of material production positioned there-between. A given fluidized bed reactor may have a single chamber or multiple chambers, as desired. An example of a fluidized bed reactor is seen in FIG. 1. As shown in FIG. 1, flowing liquid enters the reactor (in flow) and the four chambers thereof, where the chambers include particulate seed structures, e.g., as described above. The flowing liquid entering the reactor includes an added divalent cation source, e.g., as described above. Seed structure contacte liquid flows out of the top of the multiple chambers (outflow). Where desired, the fluidized bed may include structures, e.g., filters, meshes, frits, etc., or other retaining structures which serve to keep the product material in the fluidize bed.

Methods as described herein may further include separating the non-slurry solid phase $CO_2$ sequestering carbonate material from the aqueous bicarbonate rich product containing liquid. Any convenient separation protocol may be employed to remove the product material from the liquid. As such, the product material may be pulled out of the liquid, the liquid may be drained from the product material, etc., as desired. In some instances, the material is removed from the liquid while the liquid is still moving. In yet other instances the material is removed from the liquid after movement of the liquid has been stopped. Compared with protocols that produce slurry products, the energy associated with drying the product materials produced according to the methods described herein is much lower. While the magnitude of difference in energy usage may vary, in some instances the difference ranges from 2 to 100 times, such as 10 to 50 times per ton of material produced. One specific challenge inherent to the field of $CO_2$ sequestering material production is reducing the amount of energy consumed during the carbonation of $CO_2$. Common extraneous sources of energy use in production methods that produce a $CO_2$ sequestering precipitate material include the removal of water from the precipitated materials after formation. Reducing energy needs normally required to separate and potentially dry precipitated material form the bulk solution is important. As compared to process in which $CO_2$ sequestering precipitate materials are produced, embodiments of the present methods produce dried tons of $CO_2$ sequestering material using 2 to 100 times less energy, such as 10 to 50 times less energy, in the water separation/drying step.

Production of Bicarbonate Rich Product Containing Liquid

In some instances, the method further includes producing the bicarbonate rich product containing liquid that is employed, e.g., as described above. Aspects of such protocols include contacting a $CO_2$ containing gas with an aqueous medium to remove $CO_2$ from the $CO_2$ containing gas. The $CO_2$ containing gas may be pure $CO_2$ or be combined with one or more other gasses and/or particulate components, depending upon the source, e.g., it may be a multi-component gas (i.e., a multi-component gaseous stream). In certain embodiments, the $CO_2$ containing gas is obtained from an industrial plant, e.g., where the $CO_2$ containing gas is a waste feed from an industrial plant. Industrial plants from which the $CO_2$ containing gas may be obtained, e.g., as a waste feed from the industrial plant, may vary. Industrial plants of interest include, but are not limited to, power plants and industrial product manufacturing plants, such as but not limited to chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

In sequestering $CO_2$ from a $CO_2$-containing gas, a $CO_2$-containing gas may be contacted with an aqueous medium under conditions sufficient to remove $CO_2$ from the $CO_2$-containing gas and produce a bicarbonate component, which bicarbonate component may then be contacted with a cation source to produce a substantially pure $CO_2$ product gas and a carbonate $CO_2$ sequestering component, e.g., as described in greater detail below.

The aqueous medium may vary, ranging from fresh water to bicarbonate buffered aqueous media. Bicarbonate buffered aqueous media employed in embodiments of the invention include liquid media in which a bicarbonate buffer is present. As such, liquid aqueous media of interest include dissolved $CO_2$, water, carbonic acid ($H_2CO_3$), bicarbonate ions ($HCO_3^-$), protons ($H^+$) and carbonate ions ($CO_3^{2-}$). The constituents of the bicarbonate buffer in the aqueous media are governed by the equation:

$$CO_2 + H_2O \rightleftharpoons H_2CO_3 \rightleftharpoons H^+ + HCO_3^- \rightleftharpoons 2H^+ + CO_3^{2-}$$

The pH of the bicarbonate buffered aqueous media may vary, ranging in some instances from 7 to 11, such as 8 to 11, e.g., 8 to 10, including 8 to 9. In some instances, the pH ranges from 8.2 to 8.7, such as from 8.4 to 8.55. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Of interest in some instances are waters that provide for excess alkalinity, which is defined as alkalinity that is provided by sources other than bicarbonate ion. In these instances, the amount of excess alkalinity may vary, so long as it is sufficient to provide 1.0 or slightly less, e.g., 0.9, equivalents of alkalinity. Waters of interest include those that provide excess alkalinity (meq/liter) of 30 or higher, such as 40 or higher, 50 or higher, 60 or higher, 70 or higher, 80 or higher, 90 or higher, 100 or higher, etc. Where such waters are employed, no other source of alkalinity, e.g., NaOH, is required.

In some instances, the aqueous medium that is contacted with the $CO_2$ containing gas is one which, in addition to the bicarbonate buffering system (e.g., as described above), further includes an amount of divalent cations. Inclusion of divalent cations in the aqueous medium can allow the concentration of bicarbonate ion in the bicarbonate rich product to be increased, thereby allowing a much larger amount of $CO_2$ to become sequestered as bicarbonate ion in the bicarbonate rich product. In such instances, bicarbonate ion concentrations that exceed 5,000 ppm or greater, such as 10,000 ppm or greater, including 15,000 ppm or greater may be achieved. For instance, calcium and magnesium occur in seawater at concentrations of 400 and 1200 ppm respectively. Through the formation of a bicarbonate rich product using seawater (or an analogous water as the aqueous medium), bicarbonate ion concentrations that exceed 10,000 ppm or greater may be achieved.

In such embodiments, the total amount of divalent cation source in the medium, which divalent cation source may be made up of a single divalent cation species (such as $Ca^{2+}$) or two or more distinct divalent cation species (e.g., $Ca^{2+}$, $Mg^{2+}$, etc.), may vary, and in some instances is 100 ppm or greater, such as 200 ppm or greater, including 300 ppm or greater, such as 500 ppm or greater, including 750 ppm or greater, such as 1,000 ppm or greater, e.g., 1,500 ppm or greater, including 2,000 ppm or greater. Divalent cations of interest that may be employed, either alone or in combination, as the divalent cation source include, but are not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$ and the like. Other cations of interest that may or may not be divalent include, but are not limited to: $Na^+$, $K^+$, $NH^{4+}$, and $Li^+$, as well as cationic species of Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Naturally occurring aqueous media which include a cation source, divalent or otherwise, and therefore may be employed in such embodiments include, but are not limited to: aqueous media obtained from seas, oceans, estuaries, lagoons, brines, alkaline lakes, inland seas, etc.

In some instances, the aqueous medium is one that has been subjected to an alkali enrichment (AE) process, such as a membrane mediated alkali enrichment process. In such instances, prior to contact with the $CO_2$ containing gas, the aqueous medium is subjected to a process that results in an increase in the pH of the aqueous medium. Of interest are membrane mediated processes, such as forward osmosis mediated process. Alkali enrichment processes of interest include, but are not limited to, those described in PCT Application Serial No. PCT/US2015/018361 now published as WO 2015/134408; the disclosure of which is herein incorporated by reference.

Contact of the $CO_2$ containing gas and bicarbonate buffered aqueous medium may be done under conditions sufficient to remove $CO_2$ from the $CO_2$ containing gas (i.e., the $CO_2$ containing gaseous stream), and increase the bicarbonate ion concentration of the buffered aqueous medium to produce a bicarbonate rich product. The $CO_2$ containing gas may be contacted with the aqueous medium using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, or packed column reactors, and the like, as may be convenient. The process may be a batch or continuous process.

Contact occurs under conditions such that a substantial portion of the $CO_2$ present in the $CO_2$ containing gas goes into solution to produce bicarbonate ions. In some instances, 5% or more, such as 10% or more, including 20% or more of all the bicarbonate ions in the initial expanded liquid phase solution (mother liquor) become sequestered in LCPs. Where desired, the $CO_2$ containing gas is contacted with the bicarbonate buffered aqueous medium in the presence of a catalyst (i.e., an absorption catalyst) that mediates the conversion of $CO_2$ to bicarbonate. Catalysts of interest are further described in U.S. patent application Ser. No. 14/112,495; the disclosure of which is herein incorporated by reference.

Contact between the alkaline aqueous medium and the $CO_2$-containing gas results in the production of a DIC containing liquid. As such, in charging the $CO_2$ capture liquid with $CO_2$, a $CO_2$ containing gas may be contacted with $CO_2$ capture liquid under conditions sufficient to produce dissolved inorganic carbon (DIC) in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2-}]$ is the carbonate concentration in the solution. The DIC of the aqueous media may vary, and in some instances may be 5,000 ppm or greater, such as 10,000 ppm or greater, including 15,000 ppm or greater. In some instances, the DIC of the aqueous media may range from 5,000 to 20,000 ppm, such as 7,500 to 15,000 ppm, including 8,000 to 12,000 ppm. The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 10, e.g., 8 to 8.5.

Where desired, following production of the LCP containing liquid, the resultant LCP containing liquid may be manipulated to increase the amount or concentration of LCP droplets in the liquid. As such, following production of the bicarbonate containing liquid, the bicarbonate containing liquid may be further manipulated to increase the concentration of bicarbonate species and produce a concentrated bicarbonate liquid. In some instances, the bicarbonate containing liquid is manipulated in a manner sufficient to increase the pH. In such instances, the pH may be increased by an amount ranging from 0.1 to 6 pH units, such as 1 to 3 pH units. The pH of the concentrated bicarbonate liquid of such step may vary, ranging in some instances from 5.0 to 13.0, such as 6.5 to 8.5. The concentration of bicarbonate species in the concentrated bicarbonate liquid may vary, ranging in some instances from 1 to 1000 mM, such as 20 to 200 mM and including 50 to 100 mM. In some instances, the concentrated bicarbonate liquid may further include an amount of carbonate species. While the amount of carbonate species may vary, in some instances the carbonate species is present in an amount ranging from 0.01 to 800 mM, such as 10 to 100 mM.

The pH of the bicarbonate liquid may be increased using any convenient protocol. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Another type of further manipulation following production that may be employed is a dewatering of the initial bicarbonate containing liquid to produce a concentrated bicarbonate containing liquid, e.g., a concentrated LCP liquid. Dewatering may be accomplished using any convenient protocol, such as via contacting the LCP composition with a suitable membrane, such as an ultrafiltration membrane, to remove water and certain species, e.g., NaCl, HCl, $H_2CO_3$ but retain LCP droplets, e.g., as described in greater detail in U.S. application Ser. No. 14/112,495; the disclosure of which is herein incorporated by reference Production of Materials from the $CO_2$ Sequestering Carbonate Product The product carbonate material may be further manipulated and/or combined with other compositions to produce a variety of end-use materials. In certain embodiments, the product carbonate composition is refined (i.e., processed) in some manner. Refinement may include a variety of different protocols. In certain embodiments, the product is subjected to mechanical refinement, e.g., grinding, in order to obtain a product with desired physical properties, e.g., particle size, etc. In certain embodiments, the product is combined with a hydraulic cement, e.g., as a sand, a gravel, as an aggregate, etc., e.g., to produce final product, e.g., concrete or mortar.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles, roofing granules, etc.) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

For example, the albedo of colored granules may be readily increased using methods as described herein to produce a carbonate layer on the surface of the colored roofing granules. While the thickness of the layer of carbonate material present on the surface of the colored roofing granules may vary, in some instances the thickness ranges from 0.1 to 200 μm, such as 1 to 150 μm, including 5 to 100 μm. A variety of different types of colored granules may be coated as described above, e.g., to enhance their reflectivity without substantially diminishing their color, if at all. Examples of types of granules that may be coated with a carbonate layer as described herein include roofing granules.

Roofing granules that may be coated with a carbonate layer, e.g., to improve their reflectivity without substantially reducing their color, if at all, may include a core formed by crushed and screened mineral materials, which are subsequently coated with one or more color coating layers comprising a binder in which is dispersed one or more coloring pigments, such as suitable metal oxides. Inorganic binders may be employed. The binder can be a soluble alkaline silicate that is subsequently insolubilized by heat or by chemical reaction, such as by reaction between an acidic material and the alkaline silicate, resulting in an insoluble colored coating on the mineral particles. The base particles employed in the process of preparing the roofing granules of the present invention can take several forms. The base particles may be inert core particles. The core particles may be chemically inert materials, such as inert mineral particles, solid or hollow glass or ceramic spheres, or foamed glass or ceramic particles. Suitable mineral particles can be produced by a series of quarrying, crushing, and screening operations, are generally intermediate between sand and gravel in size (that is, between about #8 US mesh and #70 US mesh). The core particles have an average particle size of from about 0.2 mm to about 3 mm, e.g., from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured materials such as ceramic grog and proppants, and recycled manufactured materials such as crushed bricks, concrete, porcelain, fire clay, and the like. Solid and hollow glass spheres are available, for example, from Potters Industries Inc., P.O. Box 840, Valley Forge, Pa. 19482-0840, such as SPHERI-GLASS® solid "A" glass spheres product grade 1922 having a mean size of 0.203 mm, product code 602578 having a mean size of 0.59 mm, BALLOTTINI impact beads product grade A with a size range of 600 to 850 micrometers (U.S. Seive size 20-30), and QCEL hollow spheres, product code 300 with a mean particle size of 0.090 mm. Glass spheres can be coated or treated with a suitable coupling agent if desired for better adhesion to the binder of the inner coating composition. In the granules, the particles can be coated with a coating composition that includes binder and a pigment. The coating binder can be an inorganic material, such as a metal-silicate binder, for example an alkali metal silicate, such as sodium silicate.

The coatings pigments that may be used include, but are not limited to PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

Methods as described herein may also be employed to produce frac sands. Frac-sands are used in the oil and gas recovery industry to maintain porous void space in fractured geologic structure, so as to maintain geologic fracture integrity. Methods described herein may be employed to produce coated substrates and manufactured sands with tailorable surface coatings that can contribute to the buoyancy of the sand when in fluid flow. Methods as described herein may be employed to produce substrate with a closely regular patterning or irregular patterning of carbonate materials (crystalline or amorphous) as to effectively design the surface of the sands to maintain an above average buoyancy in the flow of fracking fluid, while the fluids are being pumped under very high pressure into the geologic fracture site. In some instances, the methods produce a product with a crystalline or amorphous however unreacted cementitious coating compound, such that upon contact with a second medium, the material could react as an expansive cement, providing void space for gas and fluid flow from surrounding geologic structure. This expansive property could be activated by intimate fluid or gas contact, sustained fluid contact, or other magnetic or sound wave activation provided from the geologic surface.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

Production of Pure $CO_2$ Gas

During the production of solid carbonate compositions from the bicarbonate rich product or component thereof (e.g., LCP), one mol of $CO_2$ may be produced for every 2 mols of bicarbonate ion from the bicarbonate rich product or component thereof (e.g., LCP). For example, where solid carbonate compositions are produced by adding calcium cation to the bicarbonate rich product or component thereof (e.g., LCP), the production of solid carbonate compositions, e.g., the form of amorphous calcium carbonate minerals, may proceed according to the following reaction:

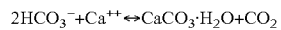
$$2HCO_3^- + Ca^{++} \leftrightarrow CaCO_3 \cdot H_2O + CO_2$$

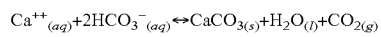
$$Ca^{++}_{(aq)} + 2HCO_3^-_{(aq)} \leftrightarrow CaCO_{3(s)} + H_2O_{(l)} + CO_{2(g)}$$

While the above reaction shows the production of 1 mol of $CO_2$, 2 moles of $CO_2$ from the $CO_2$ containing gas were initially converted to bicarbonate. As such, the overall process sequesters a net 1 mol of $CO_2$ in a carbonate compound and produces 1 mol of substantially pure CO2 product gas, which may be sequestered by injection into a subsurface geological location, as described in greater detail below. Therefore, the process is an effective $CO_2$ sequestration process. Contact of the bicarbonate rich product with the cation source results in production of a substantially pure $CO_2$ product gas. The phrase "substantially pure" means that the product gas is pure $CO_2$ or is a $CO_2$ containing gas that has a limited amount of other, non-$CO_2$ components.

Following production of the $CO_2$ product gas, aspects of the invention may include injecting the product $CO_2$ gas into a subsurface geological location to sequester $CO_2$. By injecting is meant introducing or placing the $CO_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

$CO_2$ gas production and sequestration thereof is further described in U.S. application Ser. No. 14/861,996, the disclosure of which is herein incorporated by reference.

Recycling

In some instances, the methods may include recirculating one or more of the reaction components through the material production zone. For example, the aqueous bicarbonate rich liquid, e.g., LCP containing liquid, may be recirculated through the material production zone. In such instances, an amount of fresh aqueous bicarbonate liquid may be combined with the recycled liquid to provide for desired flow through the production zone.

Systems

Aspects of the invention further include systems, e.g., small scale devices, processing plants or factories, for producing $CO_2$ sequestering carbonate materials, e.g., by practicing methods as described above. Systems of the invention may have any configuration that enables practice of the particular sequestration material production method of interest. Systems of the invention include continuous reactors that are configured for producing $CO_2$ sequestering carbonate materials. As the systems includes continuous reactors (i.e., flow reactors), they include reactors in which materials are carried in a flowing stream, where reactants (e.g., divalent cations, aqueous bicarbonate rich liquid, etc.) are continuously fed into the reactor and emerge as continuous stream of product. The continuous reactor components of the systems are therefore not batch reactors. A given system may include the continuous reactors, e.g., as described herein, in combination with one or more additional elements, as described in greater detail below.

In some embodiments, continuous reactors of the systems include: a flowing aqueous liquid, e.g., a bicarbonate rich product containing liquid; a divalent cation introducer configured to introduce divalent cations at an introduction location into the flowing aqueous liquid; and a non-slurry solid phase $CO_2$ sequestering carbonate material production location which is located at a distance from the divalent cation introducer. The flowing aqueous liquid is a stream of moving aqueous liquid, e.g., as described above, which may be present in the continuous reactor, where the continuous reactor may have any convenient configuration. Continuous reactors of interest include an inlet for a liquid and an outlet for the waste liquid, where the inlet and outlet are arranged relative to each other to provide for continuous movement or flow of the liquid into and out of the reactor. The reactor may have any convenient structure, where in some instances the reactor may have a length along which the liquid flows that is longer than any given cross sectional dimension of the reactor, where the inlet is at a first end of the reactor and the outlet is at a second end of the reactor. The volume of the reactor may vary, ranging in some instances from 10 L to 1,000,000 L, such as 1,000 L to 100,000 L.

Continuous reactors of interest further include a divalent cation introducer configured to introduce divalent cations at an introduction location into the flowing aqueous liquid. Any convenient introducer may be employed, where the introducer may be a liquid phase or solid phase introducer, depending on the nature of the divalent cation source. The introducer may be located in some instances at substantially the same, if not the same, position as the inlet for the bicarbonate rich product containing liquid. Alternatively, the introducer may be located at a distance downstream from the inlet. In such instances, the distance between the inlet and the introducer may vary, ranging in some embodiments from 1 cm to 10 m, such as 10 cm to 1 m. The introducer may be operatively coupled to a source or reservoir of divalent cations.

Continuous reactors of interest also include a non-slurry solid phase $CO_2$ sequestering carbonate material production location. This location is a region or area of the continuous reactor where a non-slurry solid phase $CO_2$ sequestering carbonate material is produced as a result of reaction of the divalent cations with bicarbonate ions of the bicarbonate rich product containing liquid. The reactor may be configured to produce any of the non-slurry solid phase $CO_2$ sequestering carbonate materials described above in the production location. In some instances, the production location is located at a distance from the divalent cation introduction location. While this distance may vary, in some instances the distance between the divalent cation introducer and the material production location ranges from 1 cm to 10 m, such as 10 cm to 1 m.

The production location may include seed structure(s), such as described above. In such instances, the reactor may be configured to contact the seed structures in a submerged or non-submerged format, such as described above. In non-submerged formats, the flowing liquid may be present on the surface of seed structures as a layer, e.g., of varying thickness, but a gas, e.g., air, separates at least two portions of the seed structure, e.g., two different particles, such that the particles are not submerged in the liquid.

In some instances, the presence of non-slurry solid phase $CO_2$ sequestering carbonate materials in the material production location results in the presence of a fluidized bed in the material production location, wherein the solids of the fluidized bed include solid phase $CO_2$ sequestering carbonate material(s), which solids may increase in mass over time as more $CO_2$ sequestering carbonate material(s) is produced.

Where desired the reactor may further include a retaining structure configured to retain non-slurry solid phase $CO_2$ sequestering carbonate materials in the material production location. Retaining structures of interest include filters, meshes or analogous structures (e.g., frits) which serve to maintain the non-slurry solid phase $CO_2$ sequestering carbonate materials in the production location despite the movement of the aqueous bicarbonate rich product containing liquid through the production location.

The reactor may have a flow modulator that is configured to maintain a desired flow rate of liquid through the reactor or portion thereof. For example, the flow modulator may be configured to maintain a constant and desired rate of liquid flow through the reactor, or may be configured to vary the flow rate of the liquid through different portions of the reactor, such that the reactor may have a first flow rate in a first portion and a second flow rate in a second portion. The flow modulator may be configured to provide for liquid flow through the reactor a value ranging from 0.1 m/s to 10 m/s, such as 1 m/s to 5 m/s.

The reactor may have a pressure modulator that is configured to maintain a desired pressure in the reactor or portion thereof. For example, the pressure modulator may be configured to maintain a constant and desired pressure throughout the reactor, or may be configured to vary the pressure in different portions of the reactor, such that the reactor may have a first pressure in a first portion and a second pressure in a second portion. For example, the reactor may have a higher pressure in the region of divalent cation introduction and a lower pressure in the region of material production. In such instances, the difference in pressure between any two regions may vary, ranging in some instances from 0.1 atm to 1,000 atm, such as 1 atm to 10 atm. The pressure modulator may be configured to provide for pressure in the reactor at a value ranging from 0.1 atm to 1,000 atm, such as 1 atm to 10 atm, which may vary among different regions of the reactor, e.g., as described above.

The reactor may have a temperature modulator that is configured to maintain a desired temperature in the reactor or portion thereof. For example, the temperature modulator may be configured to maintain a constant and desired temperature throughout the reactor, or may be configured to vary the temperature in different portions of the reactor, such that the reactor may have a first temperature in a first portion and a second temperature in a second portion of the reactor. The temperature modulator may be configured to provide for temperature in the reactor having a value ranging from −4 to 99° C., such as 0 to 80° C.

The reactor may include an agitator, e.g., to stir or agitate the non-slurry product during production. Any convenient type of agitator may be employed, including, but not limited to, a trommel, a vibration source, etc.

In some instances, the continuous reactor, e.g., as described above, is operatively coupled to an aqueous bicarbonate rich product containing liquid production unit. While such units may vary, in some instances such units include a source of the $CO_2$ containing gas; a source of an aqueous medium; and a reactor configured to contact the $CO_2$ containing gas with the aqueous medium under conditions sufficient to produce a bicarbonate rich product. Any convenient bicarbonate buffered aqueous medium source may be included in the system. In certain embodiments, the source includes a structure having an input for aqueous medium, such as a pipe or conduit from an ocean, etc. Where the aqueous medium is seawater, the source may be an input that is in fluid communication with the sea water, e.g., such as where the input is a pipe line or feed from ocean water to a land based system or an inlet port in the hull of ship, e.g., where the system is part of a ship, e.g., in an ocean based system.

The $CO_2$ containing gas source may vary. Examples of $CO_2$ containing gas sources include, but are not limited to, pipes, ducts, or conduits which direct the $CO_2$ containing gas to a portion of the system, e.g., to a reactor configured to produce a bicarbonate rich product, e.g., that includes LCPs. The aqueous medium source and the $CO_2$ containing gas source are connected to a reactor configured to contact the $CO_2$ containing gas with the bicarbonate buffered aqueous medium under conditions sufficient to produce a bicarbonate rich product, such as described above. The reactor may include any of a number of components, such as temperature regulators (e.g., configured to heat the water to a desired temperature), chemical additive components, e.g., for introducing agents that enhance bicarbonate production, mechanical agitation and physical stirring mechanisms. The reactor may include a catalyst that mediates the conversion of $CO_2$ to bicarbonate, such as described above. The reactor may also include components that allow for the monitoring of one or more parameters such as internal reactor pressure, pH, metal-ion concentration, and $pCO_2$. The reactor further includes an output conveyance for the bicarbonate rich product which is fluidically coupled, either directly or indirectly, to the inlet of the continuous reactor.

Reactors configured to produce aqueous bicarbonate rich product containing liquids are further described in U.S. application Ser. Nos. 14/112,495 and 14/636,043, the disclosures of which are herein incorporated by reference.

In certain embodiments, the system will further include a station (i.e., a building material production unit) for preparing a building material, such as described above (e.g., a cement or roofing granules), from the product material. This station can be configured to produce a variety of cements, aggregates, or cementitious materials from the material e.g., as described in U.S. Pat. No. 7,735,274; the disclosure of which application is herein incorporated by reference.

In addition, the system may include an output for the substantially pure product $CO_2$ gas that is produced in the reactor upon production of the sequestering material. The output may be operatively coupled to an injector configured to inject the product $CO_2$ into a subsurface geological location, e.g., as described above. Where desired, the system may include a compressor and/or temperature modulator for the $CO_2$ product gas, where such component, when present, are operatively positioned between the output and the injector. As the injector and output are operatively coupled, they may be directly connected to each other or connected via a conveyor, such as a pipeline.

Utility

The methods and systems described above find use in a variety of different applications, including $CO_2$ sequestration processes, i.e., processes (methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ by producing a storage stable carbon dioxide sequestering product from an amount of $CO_2$, such that the $CO_2$ is sequestered, as well as a substantially pure subsurface injectable $CO_2$ product gas. The storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Carbonate Coated Aggregates

As reviewed above, the methods and systems of the invention may be employed to produce carbonate coated aggregates, e.g., for use in concretes and other applications. The carbonate coated aggregates may be conventional or lightweight aggregates.

Aspects of the invention include $CO_2$ sequestering aggregate compositions. The $CO_2$ sequestering aggregate compositions include aggregate particles having a core and a $CO_2$ sequestering carbonate coating on at least a portion of a surface of the core. The $CO_2$ sequestering carbonate coating is made up of a $CO_2$ sequestering carbonate material, e.g., as described above.

The $CO_2$ sequestering carbonate material that is present in coatings of the coated particles of the subject aggregate compositions may vary.

In some instances, the carbonate material is a highly reflective microcrystalline/amorphous carbonate material. The microcrystalline/amorphous materials present in coatings of the invention may be highly reflective. As the materials may be highly reflective, the coatings that include the same may have a high total surface reflectance (TSR) value. TSR may be determined using any convenient protocol, such as ASTM E1918 Standard Test Method for Measuring Solar Reflectance of Horizontal and Low-Sloped Surfaces in the Field (see also R. Levinson, H. Akbari, P. Berdahl, Measuring solar reflectance—Part II: review of practical methods, LBNL 2010). In some instances, the backsheets exhibit a TSR value ranging from Rg;0=0.0 to Rg;0=1.0, such as Rg;0=0.25 to Rg;0=0.99, including Rg;0=0.40 to Rg;0=0.98, e.g., as measured using the protocol referenced above.

In some instances, the coatings that include the carbonate materials are highly reflective of near infra-red (NIR) light, ranging in some instances from 10 to 99%, such as 50 to 99%. By NIR light is meant light having a wavelength ranging from 700 nanometers (nm) to 2.5 mm. NIR reflectance may be determined using any convenient protocol, such as ASTM C1371-04a(2010)e1 Standard Test Method for Determination of Emittance of Materials Near Room Temperature Using Portable Emissometers (http://www.astm.org/Standards/C1371.htm) or ASTM G173-03(2012) Standard Tables for Reference Solar Spectral Irradiances: Direct Normal and Hemispherical on 37° Tilted Surface (http://rredc.nrel.gov/solar/spectra/aml.5/ASTMG173/ASTMG173.html). In some instances, the coatings exhibit a NIR reflectance value ranging from Rg;0=0.0 to Rg;0=1.0, such as Rg;0=0.25 to Rg;0=0.99, including Rg;0=0.40 to Rg;0=0.98, e.g., as measured using the protocol referenced above.

In some instances, the carbonate coatings are highly reflective of ultra-violet (UV) light, ranging in some instances from 10 to 99%, such as 50 to 99%. By UV light is meant light having a wavelength ranging from 400 nm and 10 nm. UV reflectance may be determined using any convenient protocol, such as ASTM G173-03(2012) Standard Tables for Reference Solar Spectral Irradiances: Direct Normal and Hemispherical on 37° Tilted Surface. In some instances, the materials exhibit a UV value ranging from Rg;0=0.0 to Rg;0=1.0, such as Rg;0=0.25 to Rg;0=0.99, including Rg;0=0.4 to Rg;0=0.98, e.g., as measured using the protocol referenced above.

In some instances, the coatings are reflective of visible light, e.g., where reflectivity of visible light may vary, ranging in some instances from 10 to 99%, such as 10 to 90%. By visible light is meant light having a wavelength ranging from 380 nm to 740 nm. Visible light reflectance properties may be determined using any convenient protocol, such as ASTM G173-03(2012) Standard Tables for Reference Solar Spectral Irradiances: Direct Normal and Hemispherical on 37° Tilted Surface. In some instances, the coatings exhibit a visible light reflectance value ranging from Rg;0=0.0 to Rg;0=1.0, such as Rg;0=0.25 to Rg;0=0.99, including Rg;0=0.4 to Rg;0=0.98, e.g., as measured using the protocol referenced above.

The materials making up the carbonate components are, in some instances, amorphous or microcrystalline. Where the materials are microcrystalline, the crystal size, e.g., as determined using the Scherrer equation applied to the FWHM of X-ray diffraction pattern, is small, and in some instances is 1000 microns or less in diameter, such as 100 microns or less in diameter, and including 10 microns or less in diameter. In some instances, the crystal size ranges in diameter from 1000 μm to 0.001 μm, such as 10 to 0.001 μm, including 1 to 0.001 μm. In some instances, the crystal size is chosen in view of the wavelength(s) of light that are to be reflected. For example, where light in the visible spectrum is to be reflected, the crystal size range of the materials may be selected to be less than one-half the "to be reflected" range, so as to give rise to photonic band gap. For example, where the to be reflected wavelength range of light is 100 to 1000 nm, the crystal size of the material may be selected to be 50 nm or less, such as ranging from 1 to 50 nm, e.g., 5 to 25 nm. In some embodiments, the materials produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 μm to 500 μm, such as from 5 μm to 100 μm. In yet other embodiments, substantially completely amorphous solids are produced.

The density, porosity, and permeability of the coating materials may vary according to the application. With respect to density, while the density of the material may vary, in some instances the density ranges from 5 g/cm$^3$ to 0.01 g/cm$^3$, such as 3 g/cm$^3$ to 0.3 g/cm$^3$ and including 2.7 g/cm$^3$ to 0.4 g/cm$^3$. With respect to porosity, as determined by Gas Surface Adsorption as determined by the BET method (Brown Emmett Teller (e.g., as described at http://en.wikipedia.org/wiki/BET_theory, S. Brunauer, P. H. Emmett and E. Teller, *J. Am. Chem. Soc.*, 1938, 60, 309. doi:10.1021/ja01269a023) the porosity may range in some instances from 100 m$^2$/g to 0.1 m$^2$/g, such as 60 m$^2$/g to 1 m$^2$/g and including 40 m$^2$/g to 1.5 m$^2$/g. With respect to permeability, in some instances the permeability of the material may range from 0.1 to 100 darcies, such as 1 to 10 darcies, including 1 to 5 darcies (e.g., as determined using the protocol described in H. Darcy, Les Fontaines Publiques de la Ville de Dijon, Dalmont, Paris (1856).). Permeability may also be characterized by evaluating water absorption of the material. As determined by water absorption protocol, e.g., the water absorption of the material ranges, in some embodiments, from 0 to 25%, such as 1 to 15% and including from 2 to 9%.

The hardness of the materials may also vary. In some instances, the materials exhibit a Mohs hardness of 3 or greater, such as 5 or greater, including 6 or greater, where the hardness ranges in some instances from 3 to 8, such as 4 to 7 and including 5 to 6 Mohs (e.g., as determined using the protocol described in American Federation of Mineralogical Societies. "Mohs Scale of Mineral Hardness"). Hardness may also be represented in terms of tensile strength, e.g., as determined using the protocol described in ASTM C1167. In some such instances, the material may exhibit a compressive strength of 100 to 3000 N, such as 400 to 2000 N, including 500 to 1800 N.

In some embodiments, a the carbonate material includes one or more contaminants predicted not to leach into the environment by one or more tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. Tests and combinations of tests may be chosen depending upon likely contaminants and storage conditions of the composition. For example, in some embodiments, the composition may include As, Cd, Cr, Hg, and Pb (or products thereof), each of which might be found in a waste gas stream of a coal-fired power plant. Since TCLP tests for As, Ba, Cd, Cr, Pb, Hg, Se, and Ag, TCLP may be an appropriate test for aggregates described herein. In some embodiments, a carbonate composition of the invention includes As, wherein the composition is predicted not to leach As into the environment. For example, a TCLP extract of the composition may provide less than 5.0 mg/L As indicating that the composition is not hazardous with respect to As. In some embodiments, a carbonate composition of the invention includes Cd, wherein the composition is predicted not to leach Cd into the environment. For example, a TCLP extract of the composition may provide less than 1.0 mg/L Cd indicating that the composition is not hazardous with respect to Cd. In some embodiments, a carbonate composition of the invention includes Cr, wherein the composition is predicted not to leach Cr into the environment. For example, a TCLP extract of the composition may provide less than 5.0 mg/L Cr indicating that the composition is not hazardous with respect to Cr. In some embodiments, a carbonate composition of the invention includes Hg, wherein the composition is predicted not to leach Hg into the environment. For example, a TCLP extract of the composition may provide less than 0.2 mg/L Hg indicating that the composition is not hazardous with respect to Hg. In some embodiments, a carbonate composition of the invention includes Pb, wherein the composition is predicted not to leach Pb into the environment. For example, a TCLP extract of the composition may provide less than 5.0 mg/L Pb indicating that the composition is not hazardous with respect to Pb. In some embodiments, a carbonate composition and aggregate that includes of the same of the invention may be non-hazardous with respect to a combination of different contaminants in a given test. For example, the carbonate composition may be non-hazardous with respect to all metal contaminants in a given test. A TCLP extract of a composition, for instance, may be less than 5.0 mg/L in As, 100.0 mg/L in Ba, 1.0 mg/L in Cd, 5.0 mg/mL in Cr, 5.0 mg/L in Pb, 0.2 mg/L in Hg, 1.0 mg/L in Se, and 5.0 mg/L in Ag. Indeed, a majority if not all of the metals tested in a TCLP analysis on a composition of the invention may be below detection limits. In some embodiments, a carbonate composition of the invention may be non-hazardous with respect to all (e.g., inorganic, organic, etc.) contaminants in a given test. In some embodiments, a carbonate composition of the invention may be non-hazardous with respect to all contaminants in any combination of tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. As such, carbonate compositions and aggregates including the same of the invention may effectively sequester $CO_2$ (e.g., as carbonates, bicarbonates, or a combinations thereof) along with various chemical species (or co-products thereof) from waste gas streams, industrial waste sources of divalent cations, industrial waste sources of proton-removing agents, or combinations thereof that might be considered contaminants if released into the environment. Compositions of the invention incorporate environmental contaminants (e.g., metals and co-products of metals such as Hg, Ag, As, Ba, Be, Cd, Co, Cr, Cu, Mn, Mo, Ni, Pb, Sb, Se, Tl, V, Zn, or combinations thereof) in a non-leachable form.

The aggregate compositions of the invention include particles having a core region and a $CO_2$ sequestering carbonate coating on at least a portion of a surface of the core. The coating may cover 10% or more, 20% or more, 30% or more, 40% or more, 50% or more, 60% or more, 70% or more, 80% or more, 90% or more, including 95% or more of the surface of the core. The thickness of the carbonate layer may vary, as desired. In some instances, the thickness may range from 0.1 μm to 10 mm, such as 1 μm to 1000 μm, including 10 μm to 500 μm.

The core of the coated particles of the aggregate compositions described herein may vary widely. The core may be made up of any convenient aggregate material. Examples of suitable aggregate materials include, but are not limited to: natural mineral aggregate materials, e.g., carbonate rocks, sand (e.g., natural silica sand), sandstone, gravel, granite, diorite, gabbro, basalt, etc.; and synthetic aggregate materials, such as industrial byproduct aggregate materials, e.g., blast-furnace slag, fly ash, municipal waste, and recycled concrete, etc. In some instances, the core comprises a material that is different from the carbonate coating.

In some instances, the aggregates are lightweight aggregates. In such instances, the core of the coated particles of the aggregate compositions described herein may vary widely, so long as when it is coated it provides for the desired lightweight aggregate composition. The core may be made up of any convenient material. Examples of suitable aggregate materials include, but are not limited to: conventional lightweight aggregate materials, e.g., naturally occurring lightweight aggregate materials, such as crushed volcanic rocks, e.g., pumice, scoria or tuff, and synthetic materials, such as thermally treated clays, shale, slate, diatomite, perlite, vermiculite, blast-fumace slag and fly ash; as well as unconventional porous materials, e.g., crushed corals, synthetic materials like polymers and low density polymeric materials, recycled wastes such as wood, fibrous materials, cement kiln dust residual materials, recycled glass, various volcanic minerals, granite, silica bearing minerals, mine tailings and the like.

The physical properties of the coated particles of the aggregate compositions may vary. Aggregates of the invention have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g., 1.2 to 2.0 g/cc or 1.4 to 1.8 g/cc. In some embodiments the invention provides aggregates that range in bulk density (unit weight) from 50 lb/lb/ft$^3$ to 200 lb/ft$^3$, or 75 lb/ft$^3$ to 175 lb/ft$^3$, or 50 lb/ft$^3$ to 100 lb/ft$^3$, or 75 lb/ft$^3$ to 125 lb/ft$^3$, or lb/ft$^3$ to 115 lb/ft$^3$, or 100 lb/ft$^3$ to 200 lb/ft$^3$, or 125 lb/ft$^3$ to lb/ft$^3$, or 140 lb/ft$^3$ to 160 lb/ft$^3$, or 50 lb/ft$^3$ to 200 lb/ft$^3$. Some embodiments of the invention provide lightweight aggregate, e.g., aggregate that has a bulk density (unit weight) of 75 lb/ft$^3$ to 125 lb/ft$^3$, such as 90 lb/ft$^3$ to 115 lb/ft$^3$. In some instances, the lightweight aggregates have a weight ranging from 50 to 1200 kg/m$^3$, such as 80 to 11 kg/m$^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM $C_{131}$-03. In some embodiments aggregates of the invention have an abrasion resistance of less than 50%, or less than 40%, or less than 35%, or less than 30%, or less than 25%, or less than 20%, or less than 15%, or less than 10%, when measured by ASTM $C_{131}$-03.

Aggregates of the invention may also have a porosity within a particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

The dimensions of the aggregate particles may vary. Aggregate compositions of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 10 μm to 4.75 mm, such as 50 μm to 3.0 mm and including 75 μm to 2.0 mm. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 4.75 mm to 200 mm, such as 4.75 to 150 mm in and including 5 to 100 mm. As used herein, "aggregate" may also in some embodiments encompass larger sizes, such as 3 in to 12 in or even 3 in to 24 in, or larger, such as 12 in to 48 in, or larger than 48 in.

Concrete Dry Composites

Also provided are concrete dry composites that, upon combination with a suitable setting liquid (such as described below), produce a settable composition that sets and hardens into a concrete or a mortar. Concrete dry composites as described herein include an amount of an aggregate, e.g., as described above, and a cement, such as a hydraulic cement. The term "hydraulic cement" is employed in its conventional sense to refer to a composition which sets and hardens after combining with water or a solution where the solvent is water, e.g., an admixture solution. Setting and hardening of the product produced by combination of the concrete dry composites of the invention with an aqueous liquid results from the production of hydrates that are formed from the cement upon reaction with water, where the hydrates are essentially insoluble in water.

Aggregates of the invention find use in place of conventional natural rock aggregates used in conventional concrete when combined with pure Portland cement. Other hydraulic cements of interest in certain embodiments are Portland cement blends. The phrase "Portland cement blend" includes a hydraulic cement composition that includes a Portland cement component and significant amount of a non-Portland cement component. As the cements of the invention are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). When the exhaust gases used to provide carbon dioxide for the reaction contain SOx, then sufficient sulphate may be present as calcium sulfate in the precipitated material, either as a cement or aggregate to off set the need for additional calcium sulfate. As defined by the European Standard EN197.1, "Portland cement clinker is a hydraulic material which shall consist of at least two-thirds by mass of calcium silicates ($3CaO \cdot SiO_2$ and $2CaO \cdot SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." The concern about MgO is that later in the setting reaction, magnesium hydroxide, brucite, may form, leading to the deformation and weakening and cracking of the cement. In the case of magnesium carbonate containing cements, brucite will not form as it may with MgO. In certain embodiments, the Portland cement constituent of the present invention is any Portland cement that satisfies the ASTM Standards and Specifications of C150 (Types 1-VIII) of the American Society for Testing of Materials (ASTM C50-Standard Specification for Portland Cement). ASTM C150 covers eight types of Portland cement, each possessing different properties, and used specifically for those properties.

Also of interest as hydraulic cements are carbonate containing hydraulic cements. Such carbonate containing hydraulic cements, methods for their manufacture and use are described in U.S. Pat. No. 7,735,274; the disclosure of which applications are herein incorporated by reference.

In certain embodiments, the hydraulic cement may be a blend of two or more different kinds of hydraulic cements, such as Portland cement and a carbonate containing hydraulic cement. In certain embodiments, the amount of a first cement, e.g., Portland cement in the blend ranges from 10 to 90% (w/w), such as 30 to 70% (w/w) and including 40 to 60% (w/w), e.g., a blend of 80% OPC and 20% carbonate hydraulic cement.

In some instances, the concrete dry composite compositions, as well as concretes produced therefrom, have a CarbonStar Rating (CSR) that is less than the CSR of the control composition that does not include an aggregate of the invention. The Carbon Star Rating (CSR) is a value that characterizes the embodied carbon (in the form of $CaCO_3$) for any product, in comparison to how carbon intensive production of the product itself is (i.e., in terms of the production $CO_2$). The CSR is a metric based on the embodied mass of $CO_2$ in a unit of concrete. Of the three components in concrete—water, cement and aggregate—cement is by far the most significant contributor to $CO_2$ emissions, roughly 1:1 by mass (1 ton cement produces roughly 1 ton CO2). So, if a cubic yard of concrete uses 600 lb cement, then its CSR is 600. A cubic yard of concrete according to embodiments of the present invention which include 600 lb cement and in which at least a portion of the aggregate is carbonate coated aggregate, e.g., as described above, will have a CSR that is less than 600, e.g., where the CSR may be 550 or less, such as 500 or less, including 400 or less, e.g., 250 or less, such as 100 or less, where in some instances the CSR may be a negative value, e.g., −100 or less, such as −500 or less including −1000 or less, where in some instances the CSR of a cubic yard of concrete having 600 lbs cement may range from 500 to −5000, such as −100 to −4000, including −500 to −3000. To determine the CSR of a given cubic yard of concrete that includes carbonate coated aggregate of the invention, an initial value of $CO_2$ generated for the production of the cement component of the concrete cubic yard is determined. For example, where the yard includes 600 lbs of cement, the initial value of 600 is assigned to the yard. Next, the amount of carbonate coating in the yard is determined. Since the molecular weight of carbonate is 100 a.u., and 44% of carbonate is $CO_2$, the amount of carbonate coating is present in the yard is then multiplied by 0.44 and the resultant value subtracted from the initial value in order to obtain the CSR for the yard. For example, where a given yard of concrete mix is made up of 600 lbs of cement, 300 lbs of water, 1429 lbs of fine aggregate and 1739 lbs of coarse aggregate, the weight of a yard of concrete is 4068 lbs and the CSR is 600. If 10% of the total mass of aggregate in this mix is replaced by carbonate coating, e.g., as described above, the amount of carbonate present in the revised yard of concrete is 317 lbs. Multiplying this value by 0.44 yields 139.5. Subtracting this number from 600 provides a CSR of 460.5.

Settable Compositions

Settable compositions of the invention, such as concretes and mortars, are produced by combining a hydraulic cement with an amount of aggregate (fine for mortar, e.g., sand; coarse with or without fine for concrete) and an aqueous liquid, e.g., water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Finely divided aggregate is smaller than ⅜ inch in size and again may be graduated in much finer sizes down to 200-sieve size or so. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:1000 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 1 to 50% w/w, such as 2 to 10% w/w.

Admixtures of interest include finely divided mineral admixtures such as cementitious materials; pozzolans; pozzolanic and cementitious materials; and nominally inert materials. Pozzolans include diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Other types of admixture of interest include plasticizers, accelerators, retarders, air-entrainers, foaming agents, water reducers, corrosion inhibitors, and pigments.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. Admixtures are well-known in the art and any suitable admixture of the above type or any other desired type may be used; see, e.g., U.S. Pat. No. 7,735,274, incorporated herein by reference in its entirety.

In some instances, the settable composition is produced using an amount of a bicarbonate rich product (BRP) admixture, which may be liquid or solid form, e.g., as described in U.S. patent application Ser. No. 14/112,495 published as United States Published Application Publication No. 2014/0234946; the disclosure of which is herein incorporated by reference.

In certain embodiments, settable compositions of the invention include a cement employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable compositions are in some instances initially flowable compositions, and then set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described at ASTM C1157.

Structures

Aspects of the invention further include structures produced from the aggregates and settable compositions of the invention. As such, further embodiments include manmade structures that contain the aggregates of the invention and methods of their manufacture. Thus in some embodiments the invention provides a manmade structure that includes one or more aggregates as described herein. The manmade structure may be any structure in which an aggregate may be used, such as a building, dam, levee, roadway or any other manmade structure that incorporates an aggregate or rock. In some embodiments, the invention provides a manmade structure, e.g., a building, a dam, or a roadway, that includes an aggregate of the invention, where in some instances the aggregate may contain $CO_2$ from a fossil fuel source, e.g., as described above. In some embodiments the invention provides a method of manufacturing a structure, comprising providing an aggregate of the invention.

Utility

The subject aggregate compositions and settable compositions that include the same, find use in a variety of different applications, such as in building or construction materials. Specific structures in which the aggregates and/or settable compositions of the invention find use include, but are not limited to: pavements, architectural structures, e.g., buildings, foundations, motorways/roads, overpasses, parking structures, brick/block walls and footings for gates, fences and poles. Mortars of the invention find use in binding construction blocks, e.g., bricks, together and filling gaps between construction blocks. Mortars can also be used to fix existing structure, e.g., to replace sections where the original mortar has become compromised or eroded, among other uses.

Aggregates as discussed above are further described in U.S. Provisional Application Ser. Nos. 62/163,107 and 62/163,118; the disclosures of which are herein incorporated by reference.

Methods of Making and Acidic Bybroduct Remediation

Aggregates as described herein are conveniently fabricated using the continuous protocols as described above. Specifically, aggregates as described herein may be fabricated by using the aggregates as seed structures in a carbonate deposition continuous process, such as described above, where the deposited carbonate material may be a $CO_2$ sequestering carbonate material or other carbonate material.

With respect to aggregate production, raw input aggregate may be pretreated as desired prior to its use as seed structure in a continuous process. In some embodiments, the pretreatment of the aggregate input material is used to remediate an acidic byproduct liquid. As such, aspects of the invention include methods of remediating an acidic byproduct liquid produced by processes for sequestering $CO_2$, i.e., $CO_2$ sequestration processes (i.e., methods, protocols, etc.) that result in $CO_2$ sequestration.

By remediate is meant improve or treat in some way to make the byproduct liquid more acceptable, e.g., for subsequent disposal in the environment or further use in another process. In some instances remediation includes increasing the pH of the acidic by product liquid. While the magnitude of pH increase may vary, in some instances the magnitude is 1.0 pH scale units or greater, such s 2.0 pH scale units or greater, including 3.0 pH scale units or greater. While the pH of the remediated liquid may vary, in some instances the pH of the remediated liquid ranges from 3.0 to 8.0, such as 3.5 to 7.5, including 4.0 to 7.0.

The acidic byproduct liquid that is treated in embodiments of the invention may vary widely. In some instances, the acidic byproduct liquid has a pH that is 3.0 or less, such as 2.5 or less, including 2.0 or less, where in some instances the pH of the acidic byproduct liquid ranges from 0 to 2.5, such as 0.5 to 1.5. In some instances, the acidic byproduct liquid includes HCl. The acidic byproduct liquid may be an acidic liquid produced by a variety of different $CO_2$ sequestration processes.

In some instances, the acidic by product liquid is a liquid produced by a bicarbonate mediated $CO_2$ sequestration protocol. In such protocols, a bicarbonate rich product containing liquid, e.g., an liquid condensed phase (LCP) containing liquid, is contacted with a source of divalent cations, e.g., divalent alkali earth metal cations, under conditions sufficient to produce a solid product (e.g., carbonate product) and $CO_2$. Such protocols include, but are not limited to, those described in U.S. patent application Ser. No. 14/112,495; the disclosure of which is herein incorporated by reference.

In some instances, the acidic byproduct liquid is one that is produced by an alkali enrichment module or component of a bicarbonate mediated $CO_2$ sequestration process. By alkali enrichment protocol is meant that the methods employ an alkali enrichment protocol at some point during the method, e.g., to produce a $CO_2$ capture liquid, to enhance the alkalinity of a $CO_2$ charged liquid, etc. The alkali enrichment protocol may be employed once or two or more times during a given method, and at different stages of a given method. For example, an alkali enrichment protocol may be performed before and/or after a $CO_2$ capture liquid production step, e.g., as described in greater detail below. By "alkali enrichment protocol" is meant a method or process of increasing the alkalinity of a liquid. The alkalinity increase of a given liquid may be manifested in a variety of different ways. In some instances, increasing the alkalinity of a liquid is manifested as an increase the pH of the liquid. For example, a liquid may be processed to remove hydrogen ions from the liquid to increase the alkalinity of the liquid. In such instances, the pH of the liquid may be increased by a desirable value, such as 0.10 or more, 0.20 or more, 0.25 or more, 0.50 or more, 0.75 or more, 1.0 or more, 2.0 or more, etc. In some instances, the magnitude of the increase in pH may vary, ranging in some instances from 0.1 to 10, such as 1 to 9, including 2.5 to 7.5, e.g., 3 to 7. As such, methods may increase the alkalinity of an initial liquid to produce a product liquid having a desired pH, where in some instances the pH of the product liquid ranges from 5 to 14, such as 6 to 13, including 7 to 12, e.g., 8 to 11, where the product liquid may be viewed as an enhanced alkalinity liquid. The increase in alkalinity of a liquid may also be manifested as an increase in the dissolved inorganic carbon (DIC) content of liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2-}]$ is the carbonate concentration in the solution. The DIC of the alkali enriched liquid may vary, and in some instances may be 500 ppm or greater, such as 5,000 ppm or greater, including 15,000 ppm or greater. In some instances, the DIC of the alkali enriched liquid may range from 500 to 20,000 ppm, such as 7,500 to 15,000 ppm, including 8,000 to 12,000 ppm. In some instances, alkali enrichment is manifested as an increase in the concentration of bicarbonate species, e.g., $NaHCO_3$, e.g., to a concentration ranging from 5 to 500 mMolar, such as 10 to 200 mMolar. In some instances, the alkali enrichment protocol is a membrane mediated protocol. By membrane mediated protocol is meant a process or method which employs a membrane at some time during the method. As such, membrane mediated alkali enrichment protocols are those alkali enrichment processes in which a membrane is employed at some time during the process. While a given membrane mediated alkali enrichment protocol may vary, in some instances the membrane mediated protocol includes contacting a first liquid, e.g., a feed liquid, and a second liquid, e.g., a draw liquid, to opposite sides of a membrane. Alkali enrichment protocols and systems for practicing the same that may be adapted for use methods of the invention, e.g., as described above, include those described in U.S. patent application Ser. No. 14/636,043; the disclosure of which is herein incorporated by reference.

In addition to remediation of acidic byproduct liquids produced by bicarbonate mediated $CO_2$ sequestration process, aspects of the methods also include remediation of such liquids produced by carbonate mediated $CO_2$ sequestering protocols, i.e., alkaline intensive protocols, in which a $CO_2$ containing gas is contacted with an aqueous medium at pH of about 10 or more. Examples of such protocols include, but are not limited to, those described in U.S. Pat. Nos. 8,333,944; 8,177,909; 8,137,455; 8,114,214; 8,062,418; 8,006,446; 7,939.336; 7,931,809; 7,922,809; 7,914.685; 7,906,028; 7,887,694; 7,829,053; 7,815,880; 7,771,684; 7,753,618; 7,749,476; 7,744,761; and 7,735,274; the disclosures of which are herein incorporated by reference.

Aspects of the invention include contacting the acidic byproduct liquid with an acid neutralizing material under conditions sufficient to increase the pH of the acidic byproduct liquid and thereby remediate the acidic byproduct liquid. In some instances, the acid neutralizing material comprises a rock composition. Rock compositions of interest may vary, where examples of rock compositions include, but are not limited to: mafic rock, ultramafic rock, felsic rock, pumice rock, limestone rock, etc. In some instances, the rock neutralizing material is a fine comprising aggregate precursor composition. By fine comprises aggregate precursor composition is meant a rock composition that includes rocks of suitable size for use as aggregate, e.g., in concretes, as well as fines. Fines that are removed may vary in sized, depending on the particular application. In some instances, the fines that are moved are fines having a size smaller than that of coarse aggregate, which is defined in the art as particles having a the grain size is above 4.75 mm. In some instances, the fines that are removed are fines having a size that is smaller than fine aggregate, which is defined as aggregate passing the ⅜" (9.5-mm) sieve and almost entirely passing the No. 4 (4.75-mm) sieve and predominantly retained on the No. 200 (75-micrometer) sieve. In some instances, the fines that are moved are fins that pass through a No. 200 sieve.

Contact of the acidic byproduct liquid and neutralizing material, e.g., fine comprises aggregate precursor, may be accomplished using any convenient protocol. For examples, the liquid and material may be brought together in a suitable chamber, e.g., reactor, and subjected to agitation as desired to provide for complete contact of the material and the liquid.

Following contact, a remediated acidic byproduct liquid, i.e., product liquid, is produced, such as described above. In addition, where the neutralizing material is a fine comprising aggregate, a product aggregate is produced in which the amount of undesirable fine particles is reduced. While the magnitude of fine particle reduction in the aggregate precursor may vary, in some instances the magnitude is such that wt. % of the fine particles in the precursor is 2-fold or greater, such as 5-fold or greater, including 10-fold or greater, relative to the amount that is present in the product aggregate. In some instances the product aggregate includes substantially no fines, e.g., 5 wt. % or less fines, such as 3 wt. % or less fines, including 1 wt. % or less fines. It is noted that while the above embodiment of treating a fine comprising aggregate precursor composition to remove fines is described in terms of employing an acidic byproduct liquid, the invention is not so limited. As such, aspects of the invention include methods of treating a fine comprising aggregate composition to reduce the amount of fines present therein and produce a product aggregate using any suitable acidic liquid, which liquid may in some instances have a pH of 6 or less, e.g., 5 or less, 4 or less, 3 or less, 2 or less, including 1 or less.

Figure 2:
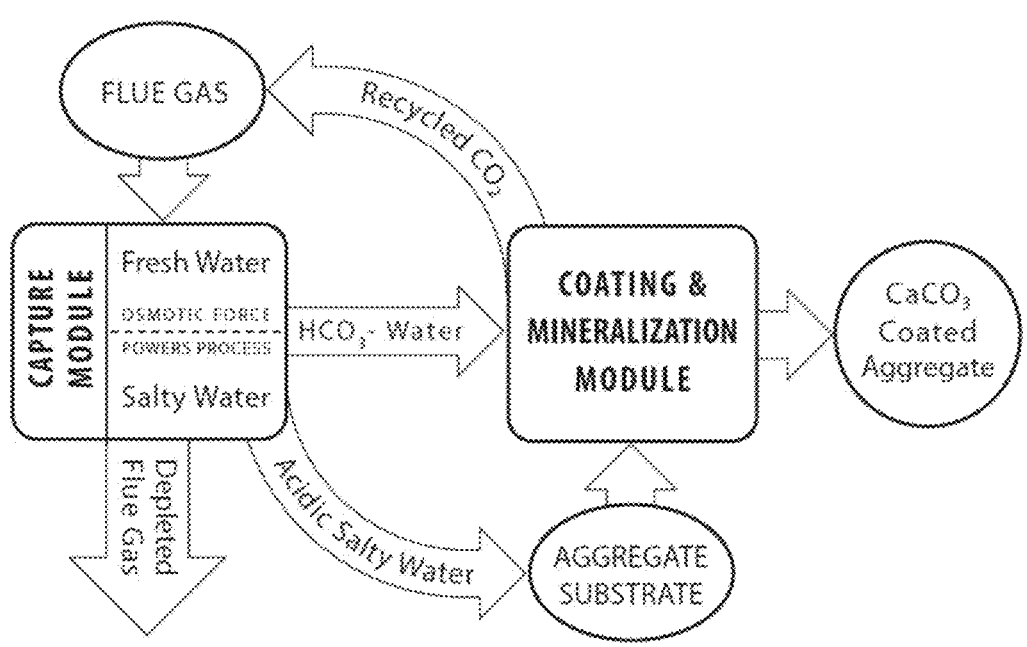
FIG. 2 provides a schematic representation of a specific embodiment of a method in accordance with an embodiment of the invention.

FIG. 2 provides a schematic representation of a specific embodiment of a method in accordance with an embodiment of the invention. As shown in FIG. 2, flue gas is contacted with water in an AE capture module (e.g., as described in PCT Application Serial No. PCT/US2015/018361 now published as WO 2015/134408 (the disclosure of which is herein incorporated by reference) to produce a bicarbonate rich product (i.e., $HCO_3^-$ water), depleted flue gas and an acidic byproduct (i.e., acidic salty water). The acidic salty water is contacted with a fine comprising aggregate, which neutralizes the acidic salty water and produces a product aggregate which is substantially free of fines. The product aggregate is then combined with the bicarbonate rich product water in a coating and mineralization module, e.g., as described above, which yields a carbonate coated aggregate (comprises $CO_2$ sequestered from the flue gas) and product $CO_2$, which is recycled to the flue gas and run through the capture module.

The following examples are offered by way of illustration and not by way of limitation.

EXPERIMENTAL

1. Laminar Flow Reactor

A. Example 1

1. Test Method

Figure 3:
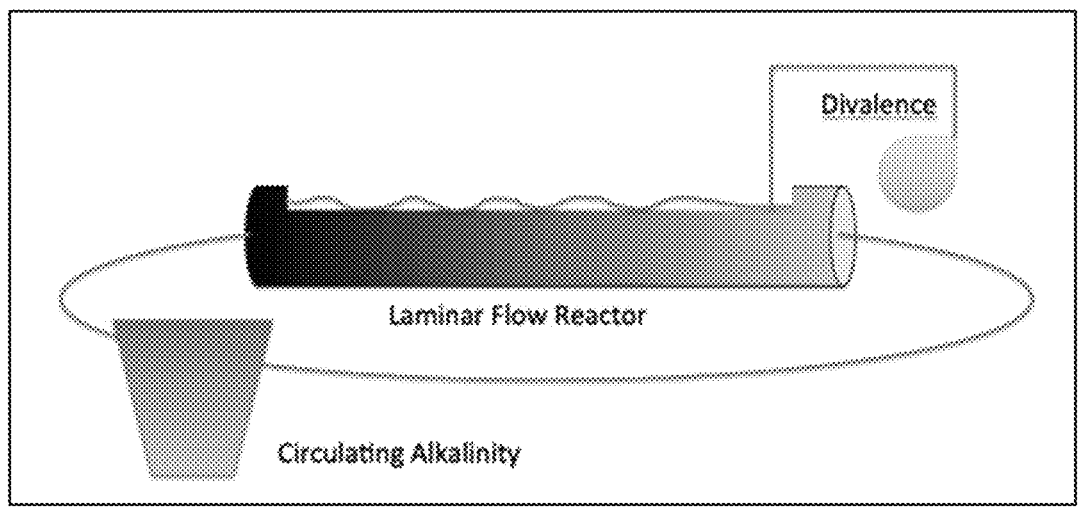
FIG. 3: Laminar Flow Continuous Reactor; counter clockwise flow, 10' ABS polymer, 3" diameter. Flow rates 153 mV/sec alkaline flow, 100 ml/min divalence flow. 36 second residence time.
Figure 4:
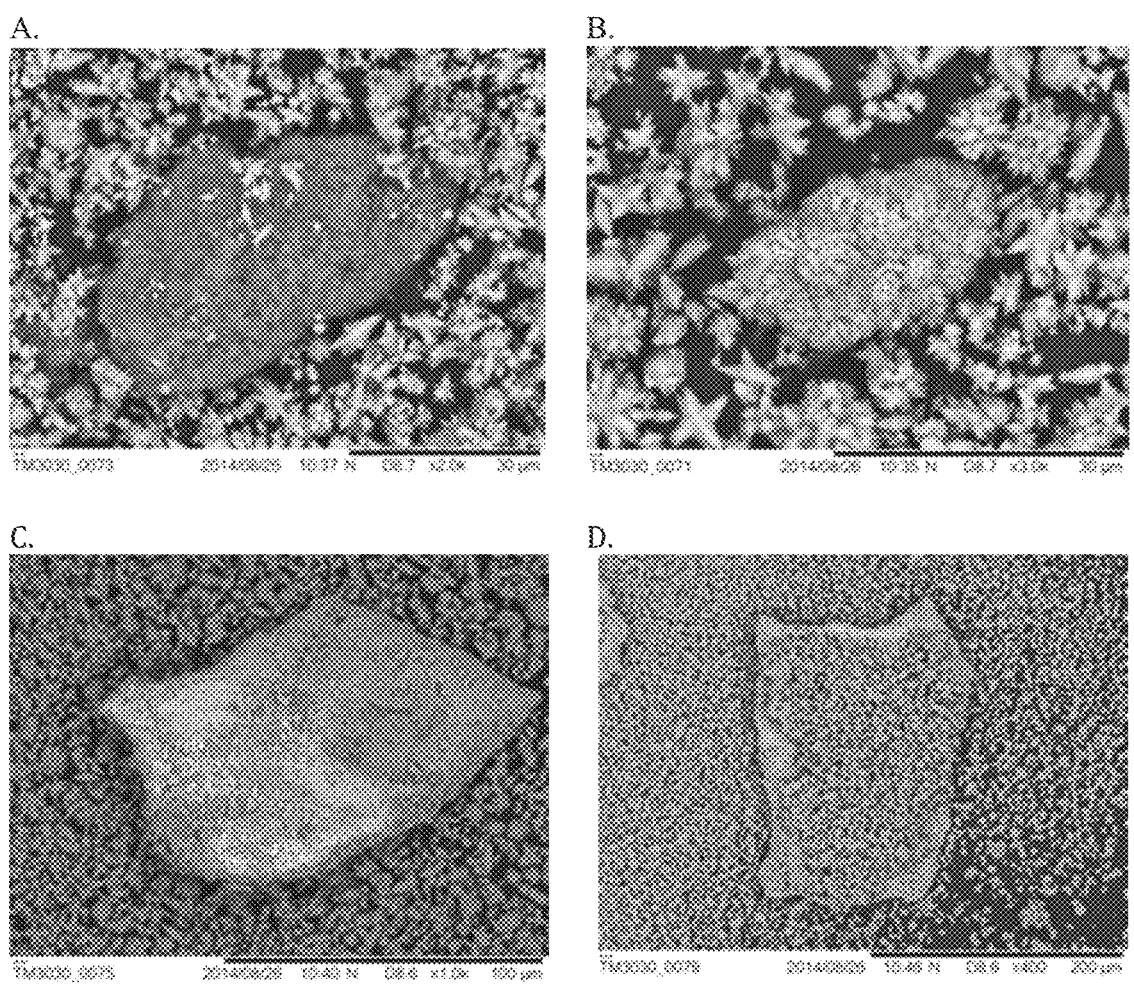
FIG. 4: SEM images showing ability to form materials from 30μ (upper left & right), 100μ (lower left), and over 200μ (lower left).

30 L of 0.15M $NaHCO_3$ were circulated through the laminar flow reactor shown in FIG. 3 at a rate of 6.5 L/min in a counter clock-wise fashion. A solution of $CaCl_2$ and $MgCl_2$ (a liquid divalent cation source) was added at a rate of 8 ml/min, ending at a 2:1 ratio of bicarbonate to overall divalent cation. The reactor was run for 24 hours and then turned off. The materials shown in the SEM images of FIG. 4 are materials that were located just after the divalence injection. The SEM images shown in FIG. 4 were taken using a Hitatchi TM-3030, mounting on an aluminum stub with carbon tape under 15 kV voltage.

Figure 5:
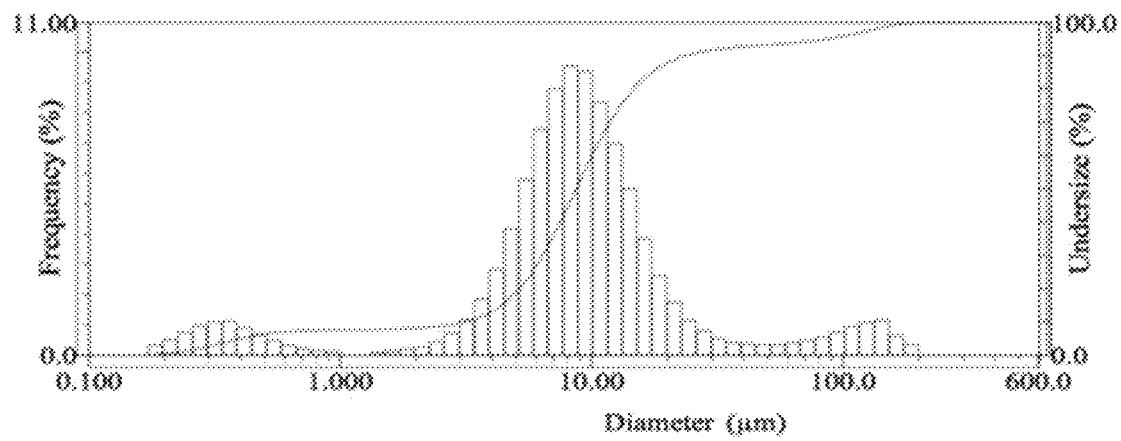
FIG. 5: Particle size distribution of precipitated powder.

The larger fraction of materials was measured on a Horiba LA-300 by adding deionized water to the LA-300 sample cup. Samples were circulated, de-bubbled and tested without sonication. Beam was aligned, and blank test taken as background. Sample was mixed well and transferred to the LA-300 by pipette. Samples were measured in 3 consecutive measurements once % T and distribution stabilized. The particle size distribution of the product is shown in FIG. 5.

Figure 6:
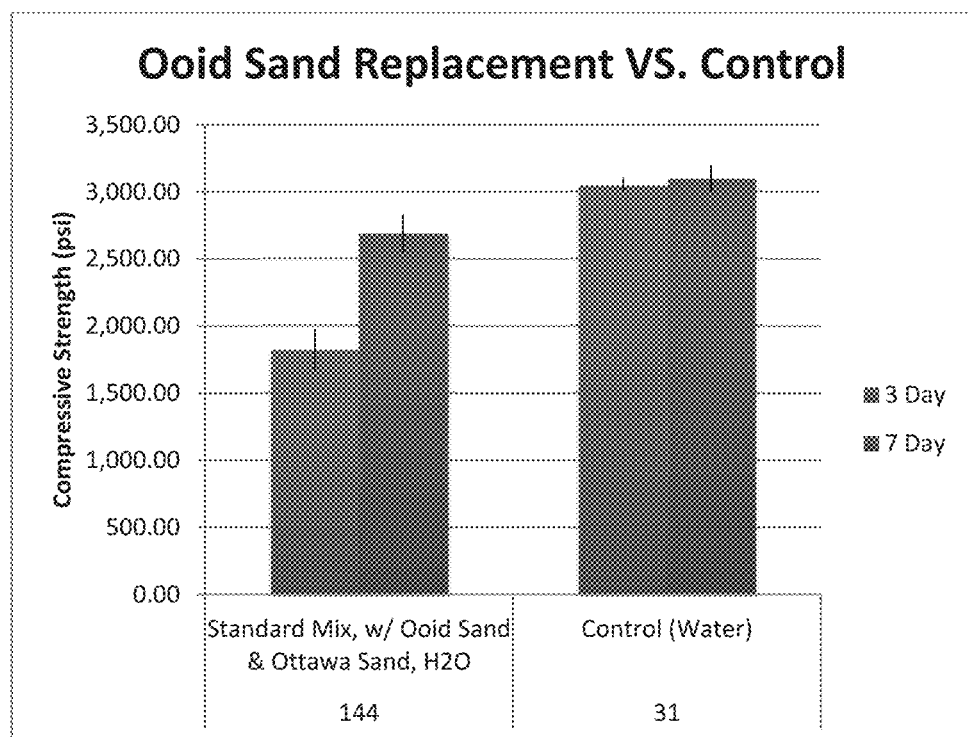
FIG. 6: Ooid materials tested in mortar.

Mortar was mixed using the synthetic ooid like materials produced as described above using common methods similar to ASTM C109. The wet ooids were used in the mix design, and the mix design was reduced in similar weights of sand and water, equivalent to the weight of the wet ooids. The results of functional assays of the result produce are shown in FIG. 6.

2. Discussion

Carbonate materials produced by way of a normal precipitation procedure result in slurries composed of residual moisture and small precipitates. These precipitates are normally on the size range of 0.01-15p. Larger sand sized materials and loose precipitate were found on the bottom of reactor after 24 hour circulation and slow dose divalent addition. By recirculating the laminar flow continuous reactor larger particles between 30μ and >200μ were produced. When tested in accordance with ASTM C109 mortar testing in a fashion considering sand and water additions, the materials showed equivalent 7 day performance and increased early strength (See FIG. 6).

B. Example 2

1. Test Method

Figure 7:
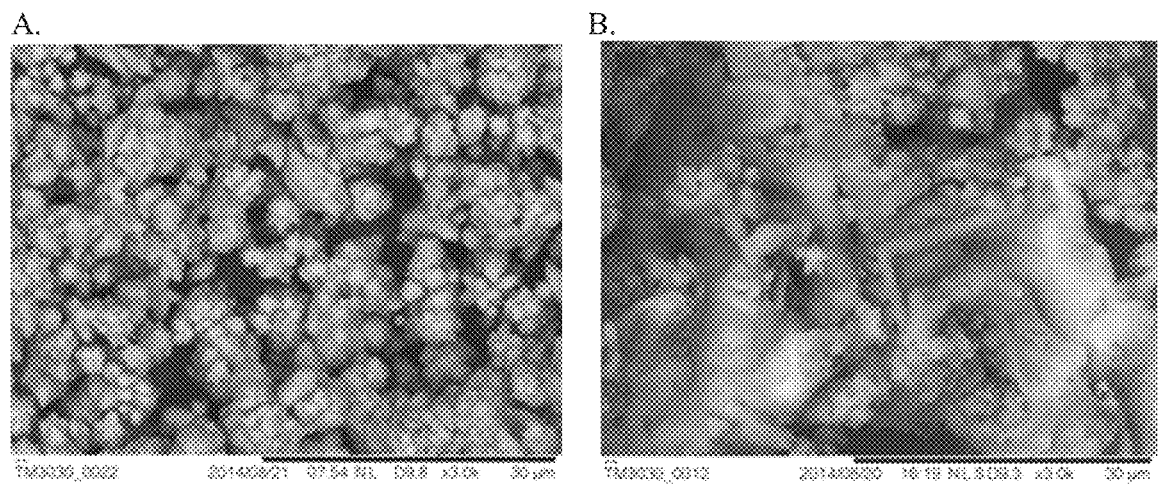
FIG. 7: SEM (left) precipitate, (right) hard scale.

45 L of 0.18M $NaHCO_3$ and 0.05M $Na_2SO_4$ (a bicarbonate containing liquid) were circulated through the laminar flow reactor shown in FIG. 1 at a rate of 6.5 L/min in a counter dock-wise fashion. A solution of $CaCl_2$ and $MgCl_2$ (a liquid divalent cation source) was added at a rate of 16 ml/min, ending at a 2:1 ratio of bicarbonate to overall divalence. The reactor was run for 24 hours and then turned off. The materials shown in the SEM images of FIG. 7 are materials that were located just after the divalence injection. SEM images were taken using a Hitatchi TM-3030, mounting on an aluminum stub with carbon tape under 15 kV voltage.

FTIR spectra were recorded using a Nicolet IS-10 by Thermo-Fisher with a HeNe laser and a fast recovery deuterated triglycerine sulfate (DTGS) detector. Scans were collected on a Germanium ATR crystal at resolution of 16 and at optical velocity of 0.4747.

2. Discussion/Conclusion

FTIR of the hard and soft scale showed a notable differences. FTIR analysis of the hard scale showed characteristic variation at the 1450 and 1119 cm-1 bond vibrations. 1450 cm-1 relates to the v3 asymmetric C—O bond vibration and 1119 cm-1 relates to the v1 symmetric C—O bond vibration. SEM images at equivalent magnification exhibit a difference between non aggregated/soft precipitate and the microstructure of the hard scale. The hard scale contains a continuous phase of carbonate adhering common precipitate particles. X-ray Diffraction results indicated that the hard scale was predominantly calcite (74%) with a complimenting amount of aragonite (20%) and the remainder being sodium chloride residual. While the soft scale crystallographic analysis resulted in magnesian calcite (76%) and the remaining balance being aragonite.

II. Continuous Beaker Reactor

A. Materials and Methods:

Chemistries described in table 1 below were dosed into the beaker of the reactor shown in FIG. 8 at variable rates between 6.1 and 121.1 LPD.

TABLE 1

Continuous Flow Beaker Reactor

| | Objective | Result | Chemisty |
|---|---|---|---|
| 1 | Literature Case/Base Case | N.A. | 0035M NaHCO3, 0.17M CaCl2, 1.03M NaCl |
| 2 | Increased Saturation | Scaled in tube | 015M NaHCO3, 0.075M CaCl2 |
| 3 | 50 C., HCO3^2-Diurnal | Diurnal cycle-scaled tube | 0.15M NaHCO3, 0.075M CaCl2 |
| 4 | Stir, Heat Diurnal, Complex Chem. | Heating element scale | 0.3M NaHCO3, 0.05M Na2SO4, 0.075M CaCl2, 0.075M MgCl2*6H2O, 0.005M SrCl2 |
| 5 | Addition of Nitorgen purge | Heating element scale & N2 | 0.3M NaHCO3, 0.05M Na2SO4, 0.075M CaCl2, 0.075M MgCl2*6H2O, 0.005M SrCl2 |
| 6 | Complex chemistry (Ca, Mg, Sr) Diurnal | Heating element scale & N2 | 0.3M NaHCO3, 0.05M Na2SO4, 0.075M CaCl2, 0.075M MgCl2*6H2O, 0.005M SrCl2 |
| 7 | Calcite Chem. | Templating | 0.6M NaHCO3, 0.3M CaCl2 |
| 8 | Templating (overflow) | Hard Scale (Overflow zone) & stirbar | 018M NaHCO3, 0.05M Na2SO4, 0.13M CaCl2, 0.05M MgCl2 (anyh) |
| 9 | Templating | Scaling on BP cements & aggregates & Stirbar | 018M NaHCO3, 0.05M Na2SO4, 0.13M CaCl2, 0.05M MgCl2 (anyh) |

Figure 8:
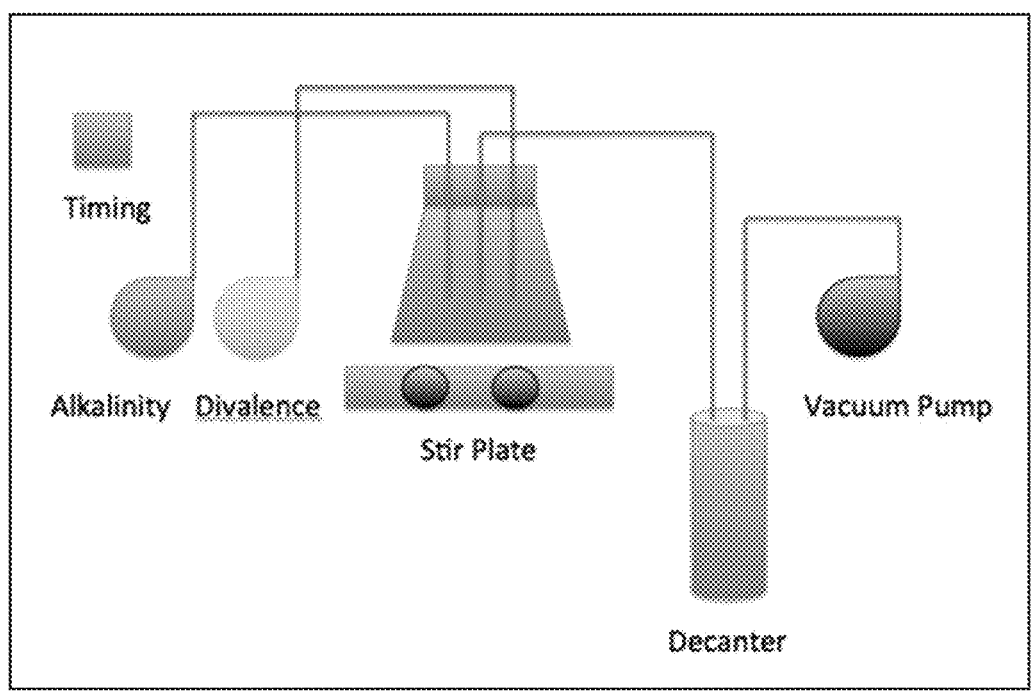
FIG. 8: Continuous Beaker Reactor employed in the Experimental Section, below.

As shown in FIG. 8, a vacuum pump removed liquids from the top of the continuous beaker reactor into a decanting vessel. Experiments included variation of temperature (22-40 C), introduction of nitrogen (1 scfm), stir speed (400 rpm), rates of dosing (100-1000 L/min), saturation index variation as well as varied chemistries.

B. Discussion/Conclusion

Figure 9:
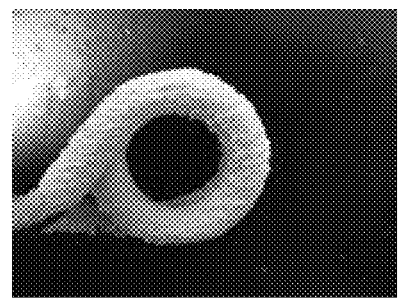
FIG. 9: Scaled carbonate on heating element
Figure 10:
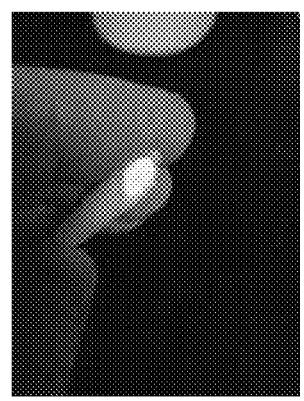
FIG. 10: Scale formed in alkaline delivery tube (occluding tube)
Figure 11:
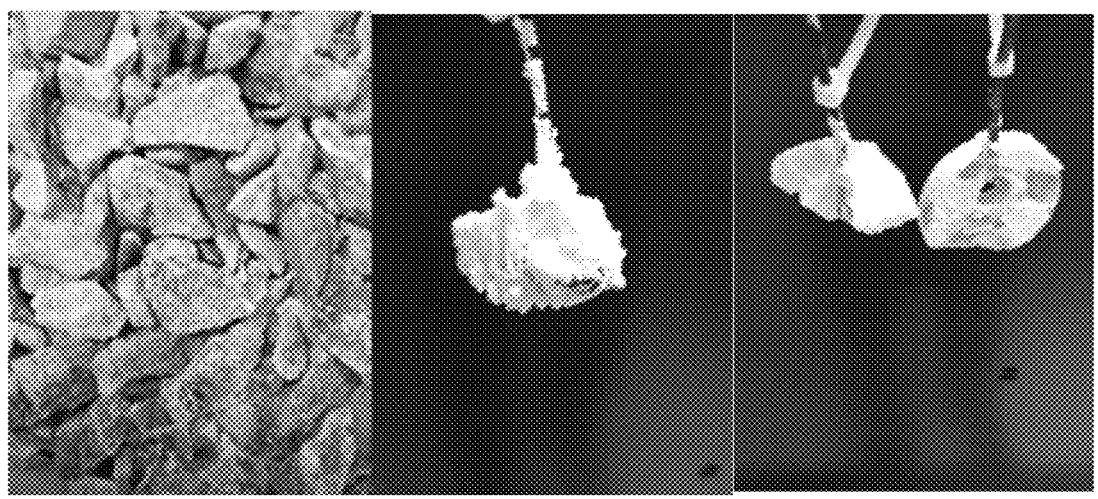
FIG. 11: Scale on templating carbonates-limestone (left image), C11 (BP carbonate cement sample (middle), S217&S245 (right image)

Two types of scale were seen in these results: a hard scale and a softer agglomerated material. The hard scale exhibited the same v3, v1 FTIR peak as seen highlighted in Reactor 1 experiments. SEM of materials showed various scales. Those that were termed 'hard scales' showed similar microstructure to the examples in Reactor 1 experiments. Pictures of various produced materials are provided in FIGS. 9 to 11.

III. Percolation Pressure Drop

A. Materials and Methods

Figure 12:
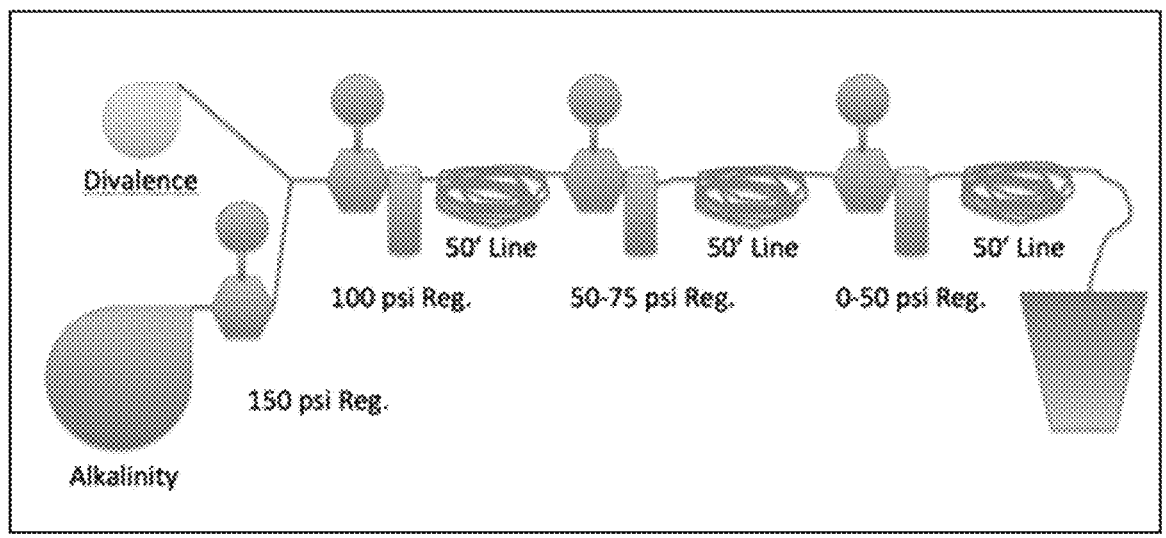
FIG. 12: Percolation Pressure Drop (dP) Continuous System employed in the Experimental Section, below.

Chemistries as detailed in Table 2 were dosed into the dP reactor illustrated in FIG. 12.

| | Pressure Drop (dP) Objective | Continuous Reactor Result | Chemistry |
|---|---|---|---|
| 1 | Base Case | Lithification on Fritt | 0.18M NaHCO3, 0.05M Na2SO4, 0.13M Cacl2, 0.05M MgCl2 (anyh) |
| 2 | Template Pack | Localized Lithification | 0.18M NaHCO3, 0.05M Na2SO4, 0.13M Cacl2, 0.05M MgCl2 (anyh) |
| 3 | BR-LCP | Lithification of Fritt | 0.273M NaHCO3, 0.13M CaCl2, 0.05M MgCl2 |

Flow rates varied between 3 L/min to 100 ml/min of alkaline flow and the flow rate of the divalent chemical reagent ranged between 111 ml/min to 2 ml/min. Solutions were passed through a series of pressure regulators decreasing the pressure from ~150 psi by ~50 psi at each of 3 pressure drop stages. The three regulators associated to pressure drops were each backed by an air-liquid separator.

B. Discussion/Conclusion

Figure 13:
FIG. 13: Common Images of various template and non-templated lithified materials produced by percolation pressure drop.

Two types of materials were also seen from this test, hard lithified scaled carbonate as well as precipitated carbonate formed mostly in the liquids capture bucket. See FIG. 13. FTIR analysis and SEM analysis was in agreement with results seen previously in the laminar flow reactor and the continuous beaker reactor.

IV. Fluidized Bed Reactor:

A. Materials and Methods

Figure 14:
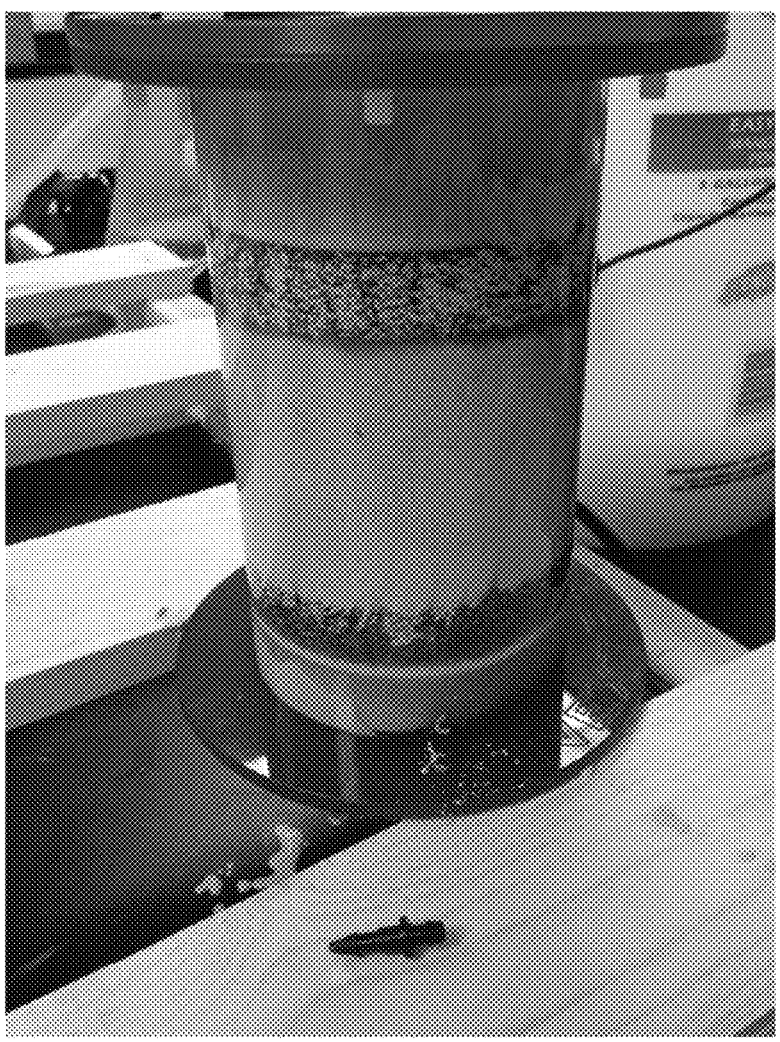
FIG. 14: Fluid bed reactor employed in the Experimental Section, below.
Figure 17:
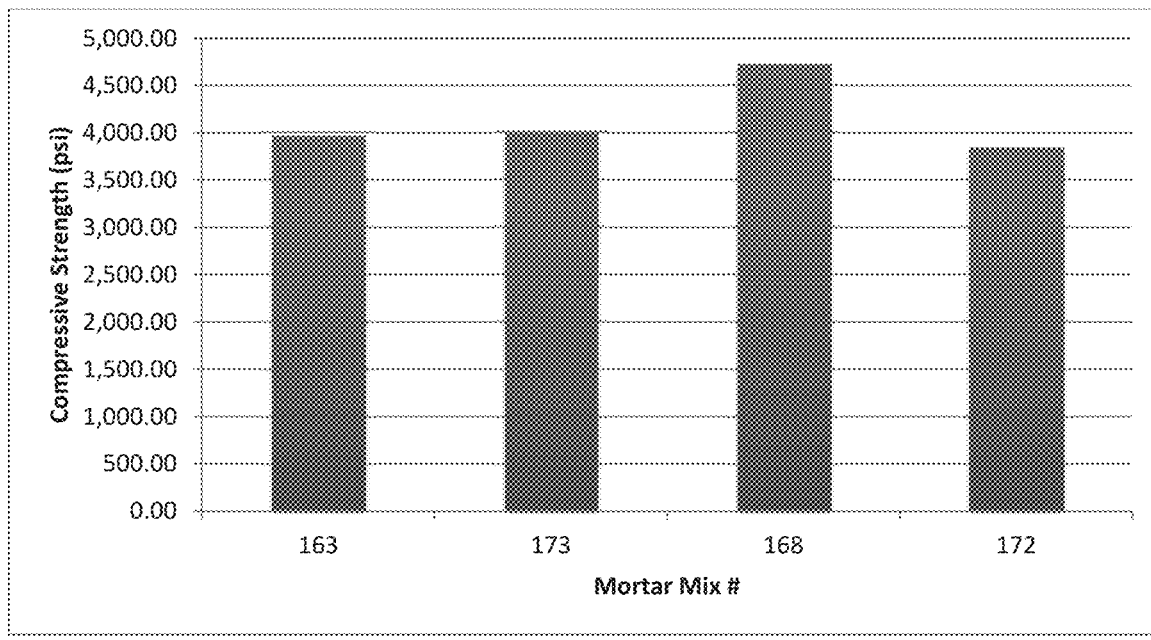
FIG. 17: Compressive strength data of accreted materials in ASTM C109 mortar testing.

Various materials were also template and aggressively coated using a fluidized bed type reactor. The materials were inserted into a fluidized bed reactor as seen in FIG. 14. The materials were exposed to liquid feeds between 1-5 L/min of an alkaline feed stream as well as a cation containing feed stream. The zone of accretion was in the fluidized bed. Materials were exposed to both calcium and magnesium containing feed waters. Various experiments are seen below with relevant yields.

yielding the data seen in FIG. 17. The materials exhibit similar performance to non-accreted samples.

V. Aggregate Production

Figure 18A:
FIG. 18A provides a picture of a fine aggregate material prior to carbonate coating in accordance with an embodiment of the invention.
Figure 18B:
FIG. 18B provides a picture of the fine aggregate of FIG. 18A after carbonate coating in accordance with an embodiment of the invention.

A. $CO_2$ Sequestering Aggregate 1 kg of normal weight sand was exposed to 15 L each of calcium chloride and bicarbonate rich liquid condensed phase containing solution. During this reaction materials were fluidized in a circulating reactor in a continuous reaction process. FIG. 18A provides a picture of the pumice prior to coating, while FIG. 18B provides a picture of the pumice after coating.

Figure 19A:
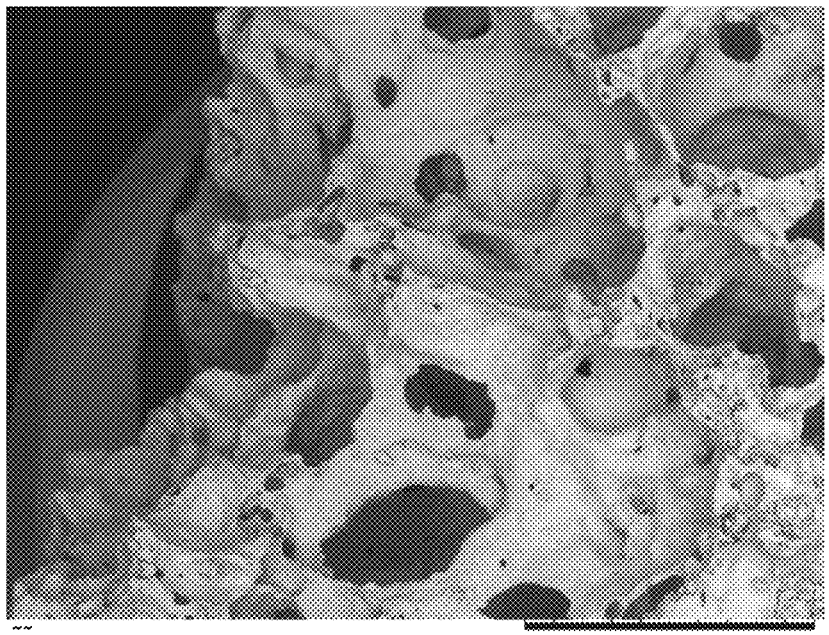
FIG. 19A provides a picture of a pumice prior to coating, while FIG. 19B provides a picture of the pumice after coating.
Figure 19B:

B. Lightweight Aggregate 15.3 kg of pumice from Northern California was exposed to 363 L each of: 0.25M calcium chloride and ~0.5M bicarbonate rich liquid condensed phase containing solution. Materials were agitated periodically at a rate of 1 rph. Solutions were introduced at varying rates between 200-600 ml/min by way of centrifugal pump. FIG. 19A provides a picture of the pumice prior to coating, while FIG. 19B provides a picture of the pumice after coating.

The coated pumice lightweight aggregate was further used in the following concrete mix:
Cement—24.1 lb
Vulcan Sand—40.7 lb (dry)
Lava Rock—11.25 lb (dry)
Water—11.3 lb The resultant mix exhibited the following properties in accordance with ASTM C330, shown in Table 1, below.

| Name | Reactor | Fluid Bed Reactor Template | Catonic Feed | Pump & Flow Rate | Anionic Feed | Final Weight | Precipitate |
|---|---|---|---|---|---|---|---|
| Run #1 | MR1 S | na | | 85MHP40 L-1 | | | |
| Run #2 | MR1 S | 400 g | 250 mM CaCl2 | 85MHP40 L-1 | 500 mM NaHCO3 | 310 g (na) | |
| Run #3 | MR1 S | 400 g | 500 mM CaCl2 | 85MHP40 L-1 | 1M NaHCO3 | 320 g (na) | |
| Run #4 | MR1 XL | 2 kg | 500 mM CaCl2 | 85MHP40 L-1 | 1M NaHCO3 | 2740 g wet | |
| Run #5 | MR1 XL | 2 kgs | 250 mM CaCl2 | 85MHP40 L-5 | 500 mM NaHCO3 | 1940 g dry | |
| Run #6 | MR1 S | 400 g-Ooids | 71 mM CaCl2 + 178 mM MgCl2 | 85MHP40 L-1 | 500 mM NaHCO3 | 440 g dry | |
| Run #7 | MR1 S | 400 g-Limestone | 500 mM CaCl2 | 85MHP40 L-1 | 1M NaHCO3 | 640 g dry | |
| Run #8 | MR1 S | 400 g-Silica Sand | 500 mM CaCl2 | 85MHP40 L-1 | 1M NaHCO3 | 680 g-dry | |
| Run #9 | MR1 | 1500 g-Limestone | 500 mM CaCl2 | 85MHP40 L-1.5 | 1M NaHCO3 | 2890 g-wet | |
| Run #10 | MR1 | 1500 g Silica Sand | 500 mM CaCl2 | 85MHP40 L-1.5 | 1M NaHCO3 | 2850 g-wet | |
| Run #11 | MR1 | 1500 g-Limestone | 500 mM CaCl2 | 85MHP40 L-1.5 | 1M NaHCO3 | | |
| Run #12 | MR1 | 1500 g Silica Sand | 500 mM CaCl2 | 85MHP40 L-1.5 | 1M NaHCO3 | | |
| Run #13 | MR1 | 1500 g-Ooids | 500 mM CaCl2 | 85MHP40 L-1.5 | 1M NaHCO3 | | |
| Run #14 | MR1 | 1500 g-Ooids | 500 mM CaCl2 | 85MHP40 L-1.5 | 1M NaHCO3 | | |
| Run #15 | MR1 XL | 2000 g-Ooids | 100 mM CaCl2 | Tetra 85 GPD-1LPM | 200 mM NaHCO3 | 2140 g-dry | 130 g |
| Run #16 | MR1 XL | 2000 g-Ooids | 50 mM CaCl2 | Tetra 85 GPD-1LPM | 100 mM NaHCO3 | 2050 g-dry | 100 g |

B. Discussion/Conclusion

Figure 15:
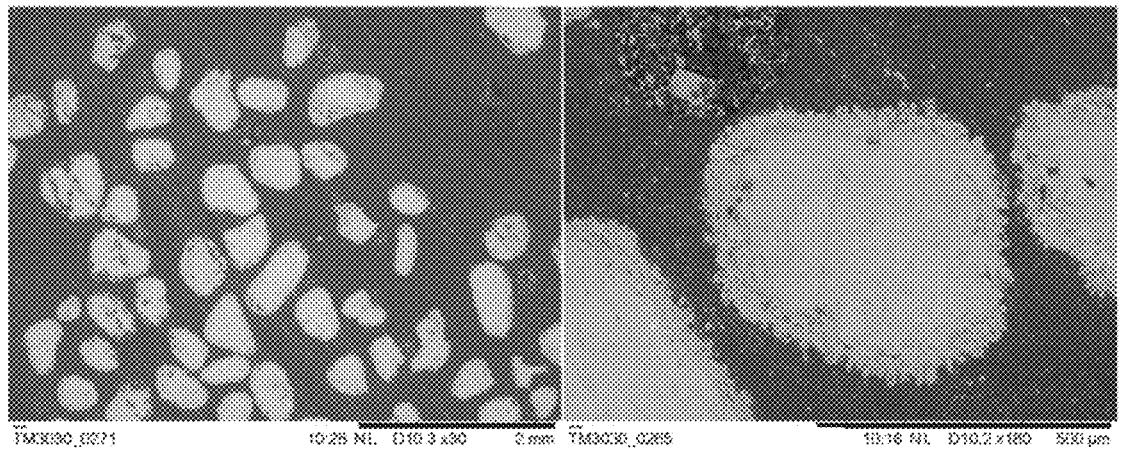
FIG. 15: SEM of accreted templating materials, cross section and various templates
Figure 15:
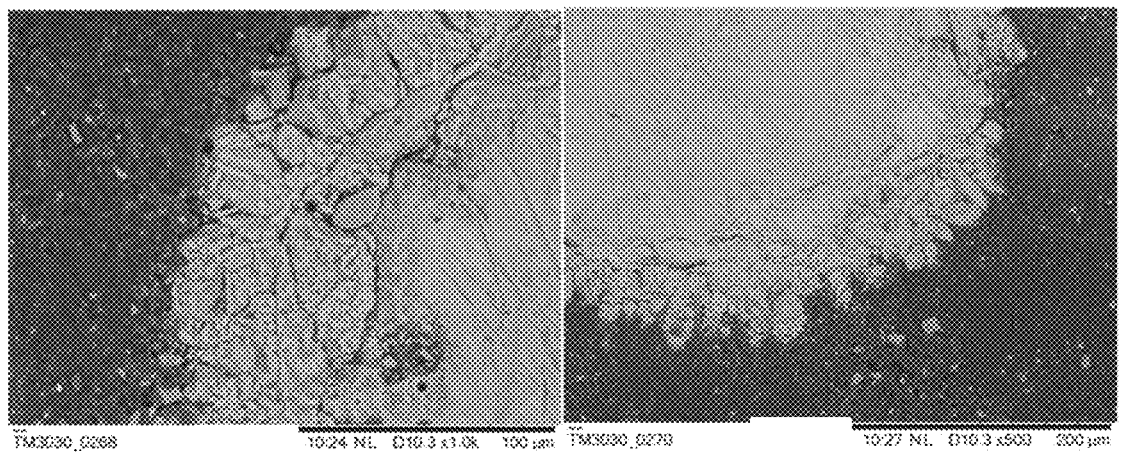
Figure 15:
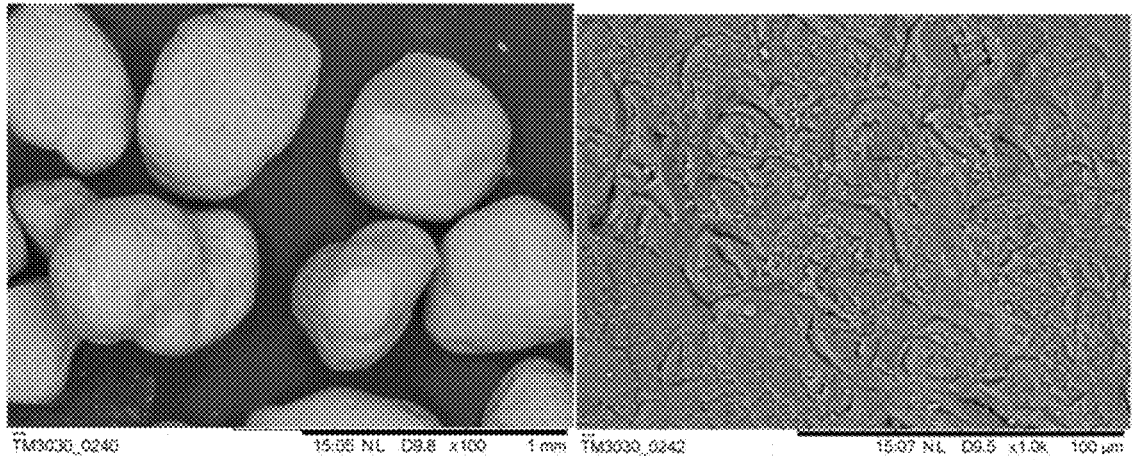
Figure 15:
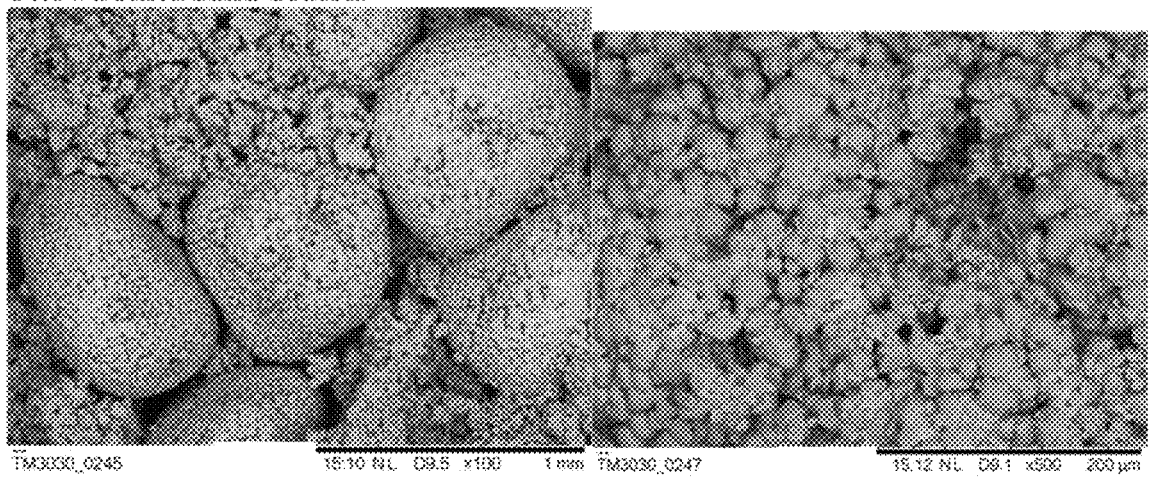
Figure 15:
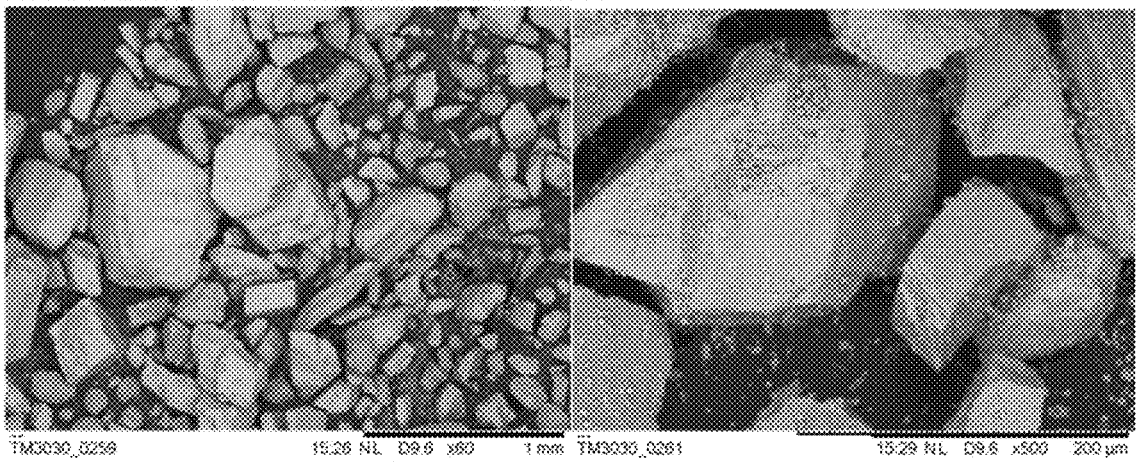
Figure 15:
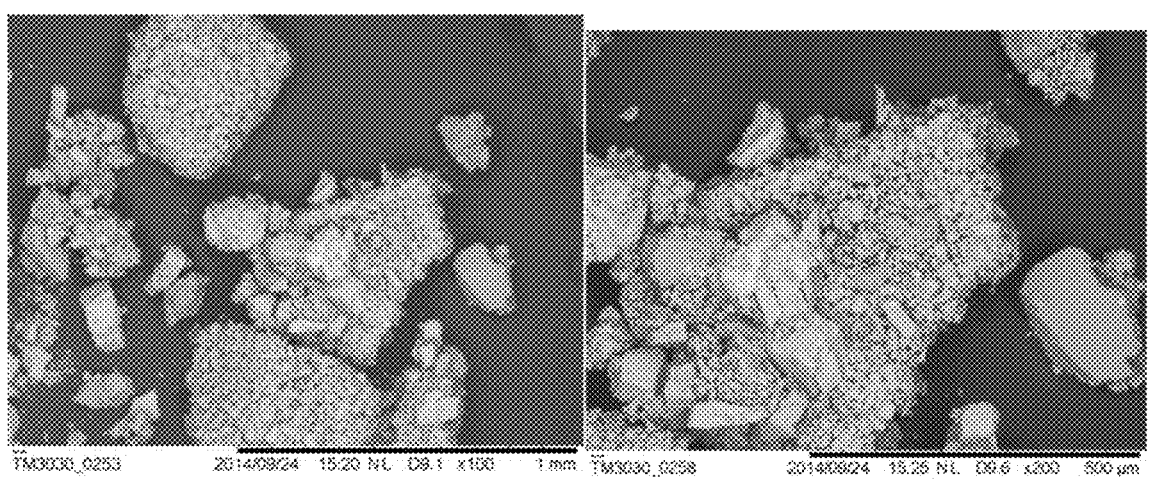
Figure 16:
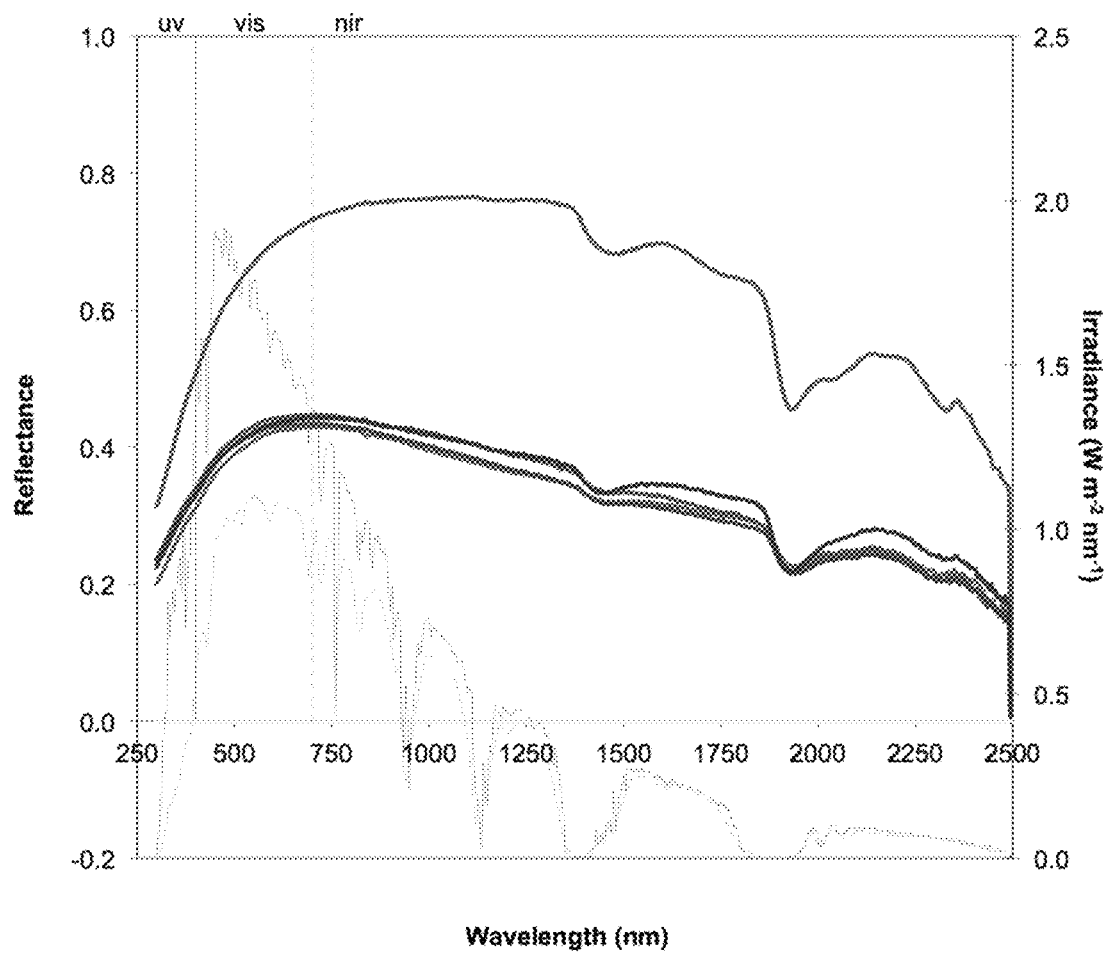
FIG. 16: Solar Reflectance of accreted materials

The coated materials can be seen in FIG. 15 (SEM). Specifically shown are coated silica sand and limestone sand materials, as well as the cross section of these materials. The materials have increased albedo and show high reflectance when placed on a roofing shingle. Solar reflectance between 38% and 69%% is shown in FIG. 16. Accreted sand materials have been tested with ASTM C109 like procedures

TABLE 1

| ASTM C330 specific characteristics. | | | |
|---|---|---|---|
| LWCA | Density | Absorption | Abrasion |
| Pumice (C19) | 37 pcf | 15.8% | 8.1% |
| Production Lot (C18) | 39 pcf | 14.1% | 9% |

The associated Carbon Star Rating for this mix design that included light weight coarse aggregate was 515.

VI. Aggrgate Mediated Acid Remediation 2 g (pumice) and 10 g (limestone) samples of rock (see left hand side of FIG. 20, top and bottom) were exposed to 100 mL 0.01N HCl and the following acid remediation resulted (further data available when needed):

| Rock (source) | Mineral (FTIR) | Mass (i) | Mass (f) | Conductivity (mS/cm) | pH equilibrium (mass limited) | pH equilibrium (mass unlimited) | Rxn. Rate 1st Order Rate [H+]/min. | Rxn. Rate 2nd Order Rate [H+]/min. |
|---|---|---|---|---|---|---|---|---|
| Pumice (Lake County CA) | Amorphous Silica | 2 g | 1.4 g | 1.26 | 4 | 7.9 | 8.47E−04 | 2.65E−06 |
| Limestone (CEMEX Brooksville FL) | Calcite | 10 g | 9.0 g | 1.4 | 7.7 | 8.1 | 5.48E−03 | 2.74E−10 |

Figure 20:
FIG. 20 provides photographs of fine comprising pumice and limestone aggregate precursor compositions (left hand side) before and after contact with an acidic solution, as described in greater detail below in the experimental section.

As can be seen, the product aggregate shown top and bottom on the right hand side of FIG. 20 is substantially free of all fines, demonstrated that contact with the 100 mL 0.01N HCl effectively removed substantially all fines from the aggregate precursor to produce a product aggregate. Other types of rocks that may be employed in such methods include, but are not limited to: Talc, Serpentine, Forsterite, Vermiculite and Phlogopite, and other Mafic and Ultramafic rocks.

VII. Improving Solar Reflectance of Colored Roofing Granules by $CaCO_3$ Coating A method has been developed to produce a high reflective roofing material with color, without having to use high reflective pigments. Increase of solar reflectance has been observed with $CaCO_3$ coating on dark granules as well as light-colored granules. Due to the high transmittance characteristics of $CaCO_3$, the color of the original granule is retained below 200 μm of coating. Solar reflectance, however, is increased due to high reflectance property of $CaCO_3$.

Figure 21:
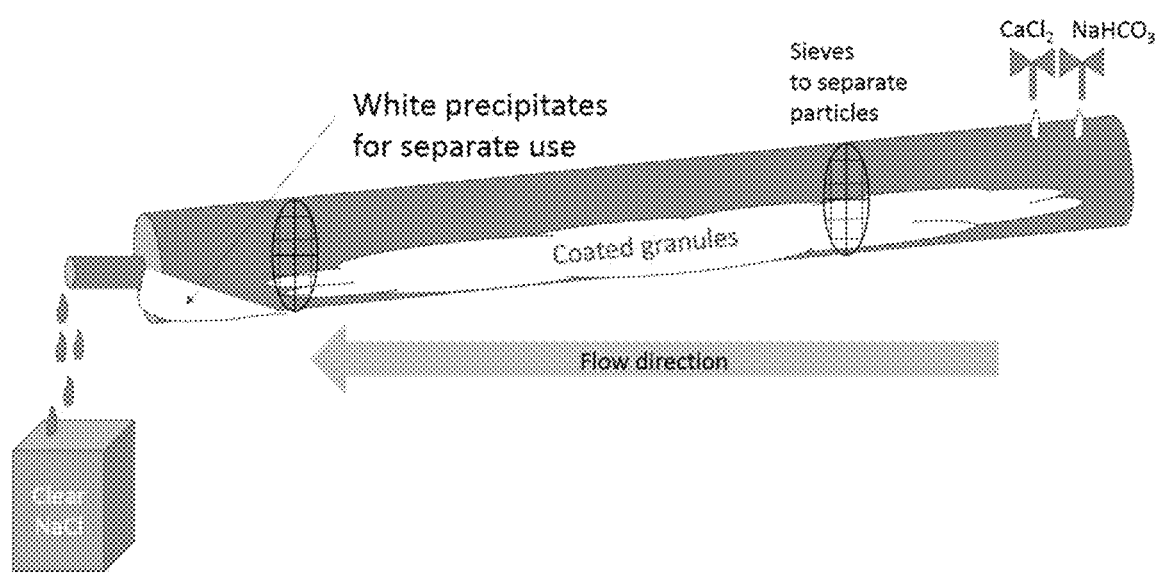
FIG. 21: Trough Continuous System employed in the Experimental Section, below.

A. Materials and Methods $CaCO_3$ precipitates were coated on raw substrate granules using single chemistry, or by combining multiple chemistry of the following mineral syntheses:
  Calcite: 0.33M $CaCl_2$+0.667M $NaHCO_3$
  Vaterite: 0.13M $CaCl_2$+0.05M $MgCl_2$+0.18M $NaHCO_3$+ 0.05M $Na_2SO_4$
  Amorphous carbonate: 0.15M $CaCl_2$+0.6M $MgCl_2$+ 0.75M $NaHCO_3$
Similarly sized granules (Santa Cruz marble, Blue Mountain limestone, or dark rhyolite) were washed and placed in the trough reactor as shown in FIG. 21 and the reactants were inserted at 19-39 ml/min using peristaltic pumps. The solutions percolated through the granules for 5 hours and coated the surfaces of the granules. The powdered precipitates which didn't get coated on granules were collected separately. The coated granules were dried and sieved.

B. Results $CaCO_3$ is reflective and has a potential for its uses in roofing granules. In addition to high reflectance property, $CaCO_3$ has high transmittance compared to $TiO_2$, therefore lower opacity and lower hiding power. Due to such high transmittance of $CaCO_3$, a thin coating will increase the solar reflectance of the granule but keep the dark color of the granule. It has been found from our experiment that 200 μm of coating is required to completely hide the original granule color. Therefore, $CaCO_3$ coating under 200 μm can retain the original color and yet enhance reflectivity of the coating.

With $CaCO_3$ coatings on Santa Cruz marble, Bluemoutain limestone, and dark rhyolite, the solar reflectance has increased 0.15-0.28 from the original granule's reflectance. The increase of solar reflectance depended on the thickness of the coating. The color of the granule became lighter with thicker $CaCO_3$ coatings, while the color stayed close to the original granule with thinner coatings.

Notwithstanding the appended clauses, the disclosure is also defined by the following clauses:

1. A method of producing a solid $CO_2$ sequestering carbonate material, the method comprising:
   introducing a divalent cation source into a flowing aqueous bicarbonate and/or carbonate containing liquid under conditions sufficient such that a non-slurry solid phase $CO_2$ sequestering carbonate material is produced in the flowing aqueous bicarbonate and/or carbonate containing liquid.
2. The method according to Clause 1, wherein the liquid is a bicarbonate containing liquid.
3. The method according to Clause 2, wherein the bicarbonate containing liquid is a liquid produced from a $CO_2$ containing gas.
4. The method according to Clause 3, wherein the $CO_2$ containing gas is a multi-component gaseous stream.
5. The method according to Clause 4, wherein the multi-component gaseous stream is a flue gas.
6. The method according to any of Clauses 1 to 5, wherein the non-slurry solid phase $CO_2$ sequestering carbonate material is freshwater stable.
7. The method according to any of Clauses 1 to 6, wherein the non-slurry solid phase $CO_2$ sequestering carbonate material is a particulate composition.
8. The method according to Clause 7, wherein the particulate composition has a mean particle diameter of 30 microns or greater.
9. The method according to any of the preceding clauses, wherein the method comprises producing the solid phase $CO_2$ sequestering carbonate material in association with a seed structure.
10. The method according to Clause 9, wherein the solid phase $CO_2$ sequestering carbonate material is produced on at least one of a surface of or in a depression of the seed structure.
11. The method according to Clause 10 where the seed structure in a porous and permeable aggregate material that is in-filled by the solid phase sequestering carbonate material to produce a less porous, denser solid aggregate.

12. The method according to Clause 11, where the in-filled aggregate is in-filled on the outer margin to a larger extent than in the inner portion, making the new aggregate less dense in the inner region as compared to the outer margin, to produce a light weight aggregate.
13. The method according to any of Clauses 9 to 12, wherein the seed structure comprises a carbonate material.
14. The method according to any of Clauses 9 to 12, wherein the seed structure comprises a non-carbonate material.
15. The method according to any of Clauses 9 to 14, wherein the seed structure is submerged in the flowing liquid.
16. The method according to any of Clauses 9 to 14, wherein the seed structure is not submerged in the flowing liquid and the liquid is flowed over a surface of the seed structure.
17. The method according to any of the preceding clauses, wherein the method is carried out in a continuous reactor.
18. The method according to any of the preceding clauses, wherein the solid phase $CO_2$ sequestering carbonate material is produced in a fluidized bed subunit of the continuous reactor.
19. The method according to any of the preceding clauses, wherein the method further comprises separating the non-slurry solid phase $CO_2$ sequestering carbonate material from the liquid.
20. The method according to any of the preceding clauses, wherein the method further comprises producing the bicarbonate containing liquid.
21. The method according to Clause 20, wherein the bicarbonate containing liquid is produced by contacting a $CO_2$ containing gas with an aqueous medium.
22. The method according to any of the preceding clauses, wherein the method further comprises producing a building material from the non-slurry solid phase $CO_2$ sequestering carbonate material.
23. The method according to Clause 22, wherein the building material comprises an aggregate.
24. The method according to Clause 22, wherein the building material comprises roofing granules.
25. A continuous reactor configured to produce a solid $CO_2$ sequestering carbonate material, the reactor comprising: a flowing aqueous bicarbonate containing liquid; a divalent cation introducer configured to introduce divalent cations at an introduction location into the flowing aqueous bicarbonate liquid; and a non-slurry solid phase $CO_2$ sequestering carbonate material production location.
26. The continuous reactor according to Clause 25, wherein the reactor comprises a flow modulator.
27. The continuous reactor according to Clauses 25 or 26, wherein the reactor comprises a pressure modulator.
28. The continuous reactor according to any of Clauses 25 to 27, wherein the reactor comprises a temperature modulator.
29. The continuous reactor according to any of Clauses 25 to 28, wherein the non-slurry solid phase $CO_2$ sequestering carbonate material production location comprises seed structures.
30. The continuous reactor according to Clause 29, wherein the seed structures comprise granules.
31. The continuous reactor according to any of Clauses 29 or 30, wherein the seed structures comprise a carbonate material.
32. The continuous reactor according to any of Clauses 29 or 30, wherein the seed structures comprise a non-carbonate material.
33. The continuous reactor according to any of Clauses 29 to 32, wherein the reactor is configured to submerge the seed structures in the liquid.
34. The continuous reactor according to any of Clauses 29 to 32, wherein the reactor is not configured to submerge the seed structures in the liquid.
35. The continuous reactor according to any of Clauses 25 to 34, wherein the non-slurry solid phase $CO_2$ sequestering carbonate material production location comprises a fluidized bed.
36. The continuous reactor according to any of Clauses 25 to 35, wherein the continuous reactor is fluidically coupled to an aqueous bicarbonate containing liquid production unit.
37. The continuous reactor according to any of Clauses 25 to 36, wherein the continuous reactor is operatively coupled to a building material production unit.
38. The continuous reactor according to Clause 37, wherein the building material comprises an aggregate.
39. The continuous reactor according to Clause 37, wherein the building material comprises roofing granules.

Notwithstanding the appended clauses, the disclosure is also defined by the following clauses:
1. An aggregate composition comprising aggregate particles comprising a core and a $CO_2$ sequestering carbonate coating on at least a portion of a surface of the core.
2. The aggregate composition according to Clause 1, wherein the carbonate coating is present on at least substantially all surfaces of the core.
3. The aggregate composition according to Clauses 1 or 2, wherein the carbonate coating is present on all surfaces of the core.
4. The aggregate composition according to any of the preceding clauses, wherein the carbonate coating has a thickness ranging from 0.1 µm to 10 mm.
5. The aggregate composition according to any of the preceding clauses, wherein the carbonate coating comprises a microcrystalline/amorphous carbonate material.
6. The aggregate composition according to Clause 5, wherein the microcrystalline/amorphous carbonate component has a crystal size ranging from 0 or X-ray Amorphous to 100 µm.
7. The aggregate composition according to Clauses 5 or 6, wherein the microcrystalline/amorphous carbonate component comprises at least one of calcium carbonate and magnesium carbonate.
8. The aggregate composition according to any of the preceding clauses, wherein the core comprises a material that is different from the carbonate coating.
9. The aggregate composition according to any of the preceding clauses, wherein the aggregate particles comprise fine aggregate particles.
10. The aggregate composition according to any of the preceding clauses, wherein the aggregate particles comprise coarse aggregate particles.
11. The aggregate composition according to any of the preceding clauses, wherein the carbonate coating comprises at least one of calcium and magnesium.
12. The aggregate composition according to Clause 11, wherein the carbonate coating comprises at least one of As, Cd, Cr, Hg, and Pb.

13. The aggregate composition according to any of the preceding clauses, wherein the carbonate coating comprises at least one non-carbonate compound selected from hydroxides, silicates, sulfates, sulfites, phosphates and arsenates.
14. A concrete dry composite comprising:
   (a) a cement; and (b) an aggregate composition according to any of Clauses 1 to 13.
15. The concrete dry composite according to Clause 14, wherein the cement comprises a hydraulic cement.
16. The concrete dry composite according to Clause 15, wherein the hydraulic cement comprises a Portland cement.
17. A settable composition produced by combining an aggregate according to any of Clauses 1 to 10, a cement and a liquid.
18. The settable composition according to Clause 17, wherein the cement is a hydraulic cement.
19. The settable composition according to Clause 18, wherein the hydraulic cement comprises a Portland cement.
20. The settable composition according to any of Clauses 17 to 19, further comprising a supplementary cementitious material.
21. The settable composition according to any of Clauses 17 to 20, further comprising an admixture.
22. The settable composition according to any of Clauses 17 to 21, wherein the settable composition is flowable.
23. A solid formed structure produced from a settable composition according to any of Clauses 17 to 22.
24. A method comprising combining an aggregate according to any of Clauses 1 to 13, a cement and a liquid in a manner sufficient to produce a settable composition that sets into a solid product.
25. The method according to Clause 24, wherein the liquid comprises an aqueous liquid.

Notwithstanding the appended clauses, the disclosure is also defined by the following clauses:

1. A lightweight aggregate composition comprising lightweight aggregate particles comprising a porous aggregate core and a carbonate coating on at least a portion of a surface of the porous aggregate core.
2. The lightweight aggregate composition according to Clause 1, wherein the carbonate coating is present on at least substantially all surfaces of the porous aggregate core.
3. The lightweight aggregate composition according to Clauses 1 or 2, wherein the carbonate coating is present on all surfaces of the porous aggregate core.
4. The lightweight aggregate composition according to any of the preceding clauses, wherein the carbonate coating has a thickness ranging from 0.1 µm to 10 mm.
5. The lightweight aggregate composition according to any of the preceding clauses, wherein the carbonate coating comprises a microcrystalline/amorphous carbonate material.
6. The lightweight aggregate composition according to Clause 5, wherein the microcrystalline/amorphous carbonate component has a crystal size ranging from 0 or X-ray Amorphous to 100 µm.
7. The lightweight aggregate composition according to Clauses 5 or 6, wherein the microcrystalline/amorphous carbonate component comprises at least one of calcium carbonate and magnesium carbonate.
8. The lightweight aggregate composition according to any of the preceding clauses, wherein the carbonate coating comprises a $CO_2$ sequestering material.
9. The lightweight aggregate composition according to any of the preceding clauses, wherein the porous aggregate core comprises a material that is different from the carbonate coating.
10. The lightweight aggregate composition according to any of the preceding clauses, wherein the porous aggregate core comprises expanded clay, expanded shale, expanded slate, expanded blast furnace slag, expanded vermiculite, expanded perlite or pumice.
11. The lightweight aggregate composition according to any of the preceding clauses, wherein the lightweight aggregate particles comprise fine aggregate particles.
12. The lightweight aggregate composition according to any of the preceding clauses, wherein the lightweight aggregate particles comprise coarse aggregate particles.
13. The lightweight aggregate composition according to any of the preceding clauses, wherein the carbonate coating comprises at least one of calcium and magnesium.
14. The lightweight aggregate composition according to Clause 13, wherein the carbonate coating comprises at least one of As, Cd, Cr, Hg, and Pb.
15. The lightweight aggregate composition according to any of the preceding clauses, wherein the carbonate coating comprises at least one non-carbonate compound selected from hydroxides, silicates, sulfates, sulfites, phosphates and arsenates.
16. A concrete dry composite comprising:
   (a) a cement; and (b) a lightweight aggregate composition according to any of Clauses 1 to 15.
17. The concrete dry composite according to Clause 16, wherein the cement comprises a hydraulic cement.
18. The concrete dry composite according to Clause 17, wherein the hydraulic cement comprises a Portland cement.
19. A settable composition produced by combining a lightweight aggregate according to any of Clauses 1 to 15, a cement and a liquid.
20. The settable composition according to Clause 19, wherein the cement is a hyrdaulic cement.
21. The settable composition according to Clause 20, wherein the hydraulic cement comprises a Portland cement.
22. The settable composition according to any of Clauses 19 to 21, further comprising a supplementary cementitious material.
23. The settable composition according to any of Clauses 19 to 22, further comprising an admixture.
24. The settable composition according to any of Clauses 19 to 23, wherein the settable composition is flowable.
25. A solid formed structure produced from a settable composition according to any of Clauses 19 to 24.
26. A method comprising combining an aggregate according to any of Clauses 1 to 15, a cement and a liquid in a manner sufficient to produce a settable composition that sets into a solid product.
27. The method according to Clause 26, wherein the liquid comprises an aqueous liquid.

Notwithstanding the appended clauses, the disclosure is also defined by the following clauses:

1. A method of increasing the pH of a $CO_2$ sequestration process generated acidic byproduct liquid, the method comprising: contacting the acidic byproduct liquid with an acid neutralizing material under conditions sufficient to increase the pH of the acidic byproduct liquid.

2. The method according to Clause 1, wherein the magnitude of increase in pH is 1.0 or greater.
3. The method according to Clause 2, wherein the magnitude of increase in pH ranges from 1.0 to 7.0.
4. The method according any of Clauses 1 to 3, wherein the acid neutralizing material comprises a fine comprising aggregate precursor and contact occurs under conditions sufficient to remove fines from the aggregate precursor to produce a product aggregate.
5. The method according to Clause 4, wherein wt. % of fines in the aggregate precursor is 2 fold or greater than in the product aggregate.
6. The method according to Clause 5, wherein method results in removal of substantially all of the fines from the precursor aggregate such that the product aggregate comprises substantially no fines.
7. The method according to Clause 6, wherein the amount of fines in the product aggregate is 5 wt. % or less.
8. The method according to any of the preceding clauses, wherein the acidic byproduct liquid is produced by a bicarbonate mediated $CO_2$ sequestration process.
9. The method according to Clause 8, wherein acidic byproduct liquid is produced by an alkali enrichment protocol of the bicarbonate mediated $CO_2$ sequestration process.
10. The method according to any of Clauses 1 to 7, wherein the acidic byproduct liquid is produced by a carbonate mediated $CO_2$ sequestration process.
11. A method of remediating an acidic aqueous liquid byproduct of an alkali enrichment protocol, the method comprising:
    contacting an acidic aqueous liquid byproduct from an alkali enrichment protocol with an acid neutralizing material in a manner sufficient to increase the pH of the acidic aqueous liquid byproduct to remediate the acidic aqueous liquid byproduct.
12. The method according to Clause 11, wherein the alkali enrichment protocol comprises a membrane mediated alkali enrichment protocol.
13. The method according to any of Clauses 11 to 12, wherein the acid neutralizing material comprises a rock composition.
14. The method according to Clause 13, wherein the rock composition comprises mafic, ultramafic and/or felsic rock.
15. The method according to Clause 13, wherein the rock composition comprises a pumice or limestone.
16. The method according to any of Clauses 11 to 15, wherein the pH of the acidic aqueous liquid byproduct is increased to a value ranging from 3.0 to 8.0.
17. The method according to any of Clauses 11 to 16, wherein the alkali enrichment protocol is part of a $CO_2$ sequestration protocol.
18. A method for sequestering $CO_2$ from a gaseous source of $CO_2$, the method comprising:
    a) subjecting an initial liquid to an alkali enrichment protocol to produce an enhanced alkalinity liquid and an acidic aqueous liquid byproduct; and
    b) employing the enhanced alkalinity liquid in a $CO_2$ sequestration protocol to sequester $CO_2$ and contacting the acidic aqueous liquid byproduct with an acid neutralizing material in a manner sufficient to increase the pH of the acidic aqueous liquid byproduct to remediate the acidic aqueous liquid byproduct.
19. The method according to Clause 18, wherein the alkali enrichment protocol is a membrane mediated protocol.
20. The method according to any of Clauses 18 and 19, wherein the method comprises producing the initial liquid by contacting a source liquid with the gaseous source of $CO_2$.
21. The method according to any of Clauses 18 to 20, wherein the method comprises contacting the enhanced alkalinity liquid with the gaseous source of $CO_2$ under conditions sufficient to produce an LCP containing liquid.
22. The method according to any of Clauses 18 to 21, wherein the gaseous source of $CO_2$ is a gaseous stream of pure $CO_2$.
23. The method according to any of Clauses 18 to 22, wherein the gaseous source of $CO_2$ is a multi-component gaseous stream.
24. The method according to Clause 23, wherein the gaseous source of $CO_2$ is a flue gas.
25. The method according to Clause 24, wherein the flue gas is obtained from an industrial source.
26. The method according to any of Clauses 18 to 25, wherein the pH of the acidic aqueous liquid byproduct is increased to a value ranging from 3.0 to 8.0.
27. The method according to any of Clauses 18 to 26, wherein the method comprises recycling the remediated acidic aqueous liquid byproduct to the alkali enrichment protocol.
28. The method according to any of Clauses 18 to 27, wherein the acid neutralizing material comprises a rock composition.
29. The method according to Clause 28, wherein the rock composition comprises mafic, ultramafic and/or felsic rock.
30. The method according to any of Clauses 28 to 29, wherein the rock composition comprises a pumice.
31. The method according to any of Clauses 18 to 30, wherein the $CO_2$ sequestration protocol comprises producing a carbonate from a LCP that comprises dissolved inorganic carbon (DIC) obtained from the gaseous source of $CO_2$.
32. The method according to Clause 31, wherein the carbonate is produced by introducing a divalent cation source into an LCP containing liquid under conditions sufficient to produce the carbonate.
33. The method according to Clause 32, wherein the divalent cation source is introduced into a flowing LCP containing liquid under conditions sufficient such that a non-slurry solid phase $CO_2$ sequestering carbonate material is produced in the flowing LCP containing liquid.
34. The method according to Clause 33, wherein the method comprises producing the solid phase $CO_2$ sequestering carbonate material in association with a seed composition.
35. The method according to Clause 34, wherein the seed composition comprises a rock composition that has been contacted with the acidic aqueous liquid byproduct.
36. The method according to any of Clauses 28 to 35, wherein the method produces an aggregate.
37. The method according to any of Clauses 18 to 36, wherein the method produces pure $CO_2$ gas.
38. A method of reducing the fine particle component of a mined rock composition, the method comprising: contacting the mined rock composition with an acidic aqueous liquid byproduct from an alkali enrichment protocol in a manner sufficient to reduce the fine particle component of the mined rock composition.

39. The method according to Clause 38, wherein the fine particle component of the mined rock composition is decreased by 10 wt % or greater.

40. The method according to any of Clauses 38 to 39, wherein the method is a method of producing an aggregate.

41. A system comprising:
   an input for a $CO_2$ sequestration process generated acidic byproduct liquid;
   an input for an acid neutralizing material; and
   a reactor for contacting a $CO_2$ sequestration process generated acidic byproduct liquid and an acid neutralizing material in a manner sufficient to produce a product liquid having a pH that is increased relative to the acidic byproduct liquid; and
   an output for the product liquid.

42. The system according to Clause 41, wherein the acidic byproduct liquid is produced by a bicarbonate mediated $CO_2$ sequestration process.

43. The system according to Clause 42, wherein acidic byproduct liquid is produced by an alkali enrichment protocol of the bicarbonate mediated $CO_2$ sequestration process.

44. The system according to any of Clauses 41 to 43, wherein the neutralizing material comprises a rock.

45. The system according to Clause 44, wherein the rock comprises an fine comprises aggregate precursor.

46. The system according to Clause 45, wherein the system comprises an output for a product aggregate.

47. The system according to any of the preceding clauses, wherein the system further comprises an alkali enrichment module operatively coupled to the input for a $CO_2$ sequestration process generated acidic byproduct liquid.

48. The system according to any of the preceding clauses, wherein the system further comprises a carbonate production module.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of producing a solid $CO_2$ sequestering carbonate material, the method comprising:
   introducing a divalent cation source into a flowing aqueous bicarbonate and/or carbonate containing liquid under conditions sufficient such that a non-slurry solid phase $CO_2$ sequestering carbonate material is produced in the flowing aqueous bicarbonate and/or carbonate containing liquid.

2. The method according to claim 1, wherein the liquid is a bicarbonate containing liquid.

3. The method according to claim 2, wherein the bicarbonate containing liquid is a liquid produced from a $CO_2$ containing gas.

4. The method according to claim 3, wherein the $CO_2$ containing gas is a multi-component gaseous stream.

5. The method according to claim 4, wherein the multi-component gaseous stream is a flue gas.

6. The method according to claim 2, wherein the method further comprises producing the bicarbonate containing liquid.

7. The method according to claim 1, wherein the non-slurry solid phase $CO_2$ sequestering carbonate material is freshwater stable.

8. The method according to claim 1, wherein the non-slurry solid phase $CO_2$ sequestering carbonate material is a particulate composition.

9. The method according to claim 8, wherein the particulate composition has a mean particle diameter of 30 microns or greater.

10. The method according to claim 1, wherein the method is carried out in a continuous reactor.

11. The method according to claim 10, wherein the solid phase $CO_2$ sequestering carbonate material is produced in a fluidized bed subunit of the continuous reactor.

12. The method according to claim 1, wherein the method further comprises separating the non-slurry solid phase $CO_2$ sequestering carbonate material from the liquid.

13. The method according to claim 6, wherein the bicarbonate containing liquid is produced by contacting a $CO_2$ containing gas with an aqueous medium.

14. The method according to claim 1, wherein the method further comprises producing a building material from the non-slurry solid phase $CO_2$ sequestering carbonate material.

15. The method according to claim 14, wherein the building material comprises an aggregate.

16. The method according to claim 14, wherein the building material comprises roofing granules.

* * * * *

UNITED STATES PATENT AND TRADEMARK OFFICE
CERTIFICATE OF CORRECTION

PATENT NO. : 11,938,458 B2
APPLICATION NO. : 17/725006
DATED : March 26, 2024
INVENTOR(S) : Brent R. Constantz et al.

It is certified that error appears in the above-identified patent and that said Letters Patent is hereby corrected as shown below:

In the Specification

Please replace "this application claims priority" with -- claims priority -- (Column 1, Line 13).

Please replace "mVsec" with -- ml/sec -- (Column 2, Line 6).

Please replace "lithified" with -- liquified -- (Column 2, Line 25).

Please replace "Bewemitz" with -- Bewernitz -- (Column 6, Line 1).

Please replace "996-1000:" with -- 996-1000; -- (Column 6, Line 7).

Please replace "$C_20H_{12}$," with -- $C_2OH_{12}$, -- (Column 6, Line 47).

Please replace "wt %" with -- wt. % -- (Column 6, Line 67).

Please replace "7,922.809;" with -- 7,922,809; -- (Column 7, Line 17).

Please replace "supersatruation." with -- supersaturation. -- (Column 8, Line 39).

Please replace "phophazene" with -- phosphazene -- (Column 9, Line 22).

Please replace "lithified" with -- liquified -- (Column 10, Line 38).

Please replace "lithified" with -- liquified -- (Column 10, Line 42).

Please replace "lithified" with -- liquified -- (Column 10, Line 45).

Please replace "$(CaMg)(CO_3)_2)$," with -- $(CaMg)(CO_3)_2$, -- (Column 11, Line 23).

Signed and Sealed this
Thirtieth Day of July, 2024

Katherine Kelly Vidal
*Director of the United States Patent and Trademark Office*

CERTIFICATE OF CORRECTION (continued)
U.S. Pat. No. 11,938,458 B2

Please replace "(TM)$_m$(CO$_3$)$_n$)," with -- (TM)$_m$(CO$_3$)$_n$, -- (Column 12, Lines 44-45).

Please replace "US20151047408" with -- US2015/047408 -- (Column 12, Line 49).

Please replace "oenetrated" with -- penetrated -- (Column 13, Line 41).

Please replace "lyfted" with -- lifted -- (Column 14, Line 4).

Please replace "contacte" with -- contacted -- (Column 14, Line 25).

Please replace "phophazene" with -- phosphazene -- (Column 18, Line 47).

Please replace "reference" with -- reference. -- (Column 19, Line 4).

Please replace "aml.5/" with -- am1.5/ -- (Column 27, Line 25).

Please replace "(1856).)" with -- (1856)). -- (Column 28, Line 32).

Please replace "a the" with -- a -- (Column 28, Line 50).

Please replace "blast-fumace" with -- blast-furnace -- (Column 30, Line 26).

Please replace "lb/lb/ft$^3$" with -- lb/ft$^3$ -- (Column 30, Line 45).

Please replace "1-VIII)" with -- I-VIII) -- (Column 32, Line 28).

Please replace "blast-fumace" with -- blast-furnace -- (Column 34, Line 7).

Please replace "durable." with -- durable, -- (Column 35, Line 2).

Please replace "Bybroduct" with -- Byproduct -- (Column 35, Line 43).

Please replace "s" with -- as -- (Column 35, Line 66).

Please replace "7,939.336;" with -- 7,939,336; -- (Column 37, Line 29).

Please replace "7,914.685;" with -- 7,914,685; -- (Column 37, Line 30).

Please replace "a the" with -- a -- (Column 37, Line 51).

Please replace "Hitatchi" with -- Hitachi -- (Column 38, Line 60).

Please replace "0.01-15p." with -- 0.01-15μ. -- (Column 39, Line 17).

Please replace "dock-wise" with -- clock-wise -- (Column 39, Line 52).

CERTIFICATE OF CORRECTION (continued)
U.S. Pat. No. 11,938,458 B2

Please replace "Hitatchi" with -- Hitachi -- (Column 39, Line 59).

Please replace "40 C)," with -- 40° C.), -- (Column 40, Line 46).

Please replace "lithified" with -- liquified -- (Column 41, Line 20).

Please replace "Aggrgate" with -- Aggregate -- (Column 43, Line 3).

Please replace "Bluemoutain" with -- Bluemountain -- (Column 44, Line 6).

Please replace "hyrdaulic" with -- hydraulic -- (Column 48, Line 42).

Please replace "wt %" with -- wt. % -- (Column 51, Line 3).